(12) United States Patent
Wetsch

(10) Patent No.: US 11,958,277 B2
(45) Date of Patent: Apr. 16, 2024

(54) EXPANDABLE WEB WITH IN-SITU COMBINATION OF EXPANSION MATERIAL COMPONENTS

(71) Applicant: Pregis Innovative Packaging LLC, Deerfield, IL (US)

(72) Inventor: Thomas D. Wetsch, Naples, FL (US)

(73) Assignee: Pregis Innovative Packaging LLC, Chicago, IL (US)

( * ) Notice: Subject to any disclaimer, the term of this patent is extended or adjusted under 35 U.S.C. 154(b) by 0 days.

(21) Appl. No.: 17/391,982

(22) Filed: Aug. 2, 2021

(65) Prior Publication Data

US 2022/0032598 A1 Feb. 3, 2022

Related U.S. Application Data

(60) Provisional application No. 62/706,111, filed on Jul. 31, 2020.

(51) Int. Cl.
| | | |
|---|---|---|
| *B32B 37/12* | (2006.01) | |
| *B32B 7/12* | (2006.01) | |
| *B32B 29/00* | (2006.01) | |
| *B32B 37/20* | (2006.01) | |
| *B65D 65/40* | (2006.01) | |

(52) U.S. Cl.
CPC ............... *B32B 37/12* (2013.01); *B32B 7/12* (2013.01); *B32B 29/005* (2013.01); *B32B 37/20* (2013.01); *B65D 65/40* (2013.01); *B32B 2553/00* (2013.01)

(58) Field of Classification Search
CPC ......... B32B 37/12; B32B 7/12; B32B 29/005; B32B 37/20; B32B 2553/00; B32B 2250/02; B32B 2250/26; B32B 2250/40; B32B 2255/12; B32B 2255/26; B32B 2266/14; B32B 2307/56; B65D 65/40; B65D 81/03; B29K 2075/00; B29L 2031/712; B29C 44/321; B29C 44/3446
See application file for complete search history.

(56) References Cited

U.S. PATENT DOCUMENTS

| | | |
|---|---|---|
| 1,686,787 A | 10/1928 | Bates |
| 1,974,339 A | 9/1934 | McDonald |
| (Continued) | | |

FOREIGN PATENT DOCUMENTS

| | | |
|---|---|---|
| JP | 105170210 A | 7/1993 |
| JP | H07165266 A | 6/1995 |
| (Continued) | | |

OTHER PUBLICATIONS

International Search Report and Written Opinion for International Application No. PCT/US21/44215, filed Aug. 2, 2021, dated Nov. 12, 2021.

(Continued)

*Primary Examiner* — Cynthia L Schaller
(74) *Attorney, Agent, or Firm* — Fox Rothschild LLP

(57) ABSTRACT

A method for making an expansion wall is provided. The method can include applying a matrix to a first ply and applying an expansion element to the surface of the matrix. A second ply is applied over the first ply to trap the matrix and expansion element therebetween. The applied expansion element is entrained into the applied matrix to provide an expansion material that is configured to expand to, and solidify in, an expanded condition upon activation.

26 Claims, 19 Drawing Sheets

(56) References Cited

U.S. PATENT DOCUMENTS

| | | |
|---|---|---|
| 2,649,199 A | 8/1953 | Werman |
| 2,847,915 A | 8/1958 | Rapp |
| 3,140,816 A | 7/1964 | Schultz |
| 3,359,703 A | 12/1967 | Quaadgras |
| 3,460,740 A | 8/1969 | Hagen |
| 3,469,769 A | 9/1969 | Guenther |
| 3,616,158 A | 10/1971 | Rubens et al. |
| 3,642,550 A | 2/1972 | Doll |
| 3,750,907 A | 8/1973 | Steele |
| 3,868,056 A | 2/1975 | Keren |
| 3,948,436 A | 4/1976 | Bambara |
| 4,193,499 A | 3/1980 | Lookholder |
| 4,232,788 A | 11/1980 | Roth |
| 4,620,633 A | 11/1986 | Lookholder |
| 4,726,804 A | 2/1988 | Stitcher |
| 4,738,391 A | 4/1988 | Wiseman |
| 4,999,975 A | 3/1991 | Willden et al. |
| 5,129,519 A | 7/1992 | David et al. |
| 5,199,795 A | 4/1993 | Russo et al. |
| 5,391,136 A | 2/1995 | Makowka |
| 5,429,576 A | 7/1995 | Doderer-Winkler |
| 5,476,175 A | 12/1995 | Jaszai |
| 5,554,093 A | 9/1996 | Porchia et al. |
| 6,410,119 B1 | 6/2002 | De Luca et al. |
| 6,435,348 B1 | 8/2002 | Pasquesi |
| 6,652,933 B2 | 11/2003 | Hall |
| 6,713,137 B1 | 3/2004 | Andersson et al. |
| 6,740,373 B1 | 5/2004 | Swoboda et al. |
| 7,807,253 B2 | 10/2010 | Kannankeril |
| 7,926,507 B2 | 4/2011 | Wetsch et al. |
| 8,061,110 B2 | 11/2011 | Wetsch |
| 8,128,770 B2 | 3/2012 | Wetsch et al. |
| 8,746,483 B2 | 6/2014 | Sierra-Gomez et al. |
| 9,028,386 B2 | 5/2015 | Fraser et al. |
| 9,573,342 B2 | 2/2017 | Frei et al. |
| 9,615,642 B2 | 4/2017 | Bergh et al. |
| 9,827,711 B2 | 11/2017 | Wetsch et al. |
| 10,183,458 B2 | 1/2019 | Fu et al. |
| 10,870,535 B2 | 12/2020 | Olness |
| 10,926,935 B2 | 2/2021 | Martin |
| 11,084,637 B1 | 8/2021 | Hoffman |
| 2003/0211268 A1 | 11/2003 | Hillemann et al. |
| 2004/0000581 A1 | 1/2004 | Brandolini et al. |
| 2004/0005100 A1 | 1/2004 | Versluys |
| 2005/0152624 A1 | 7/2005 | Versluys |
| 2008/0092488 A1 | 4/2008 | Gabrielsen et al. |
| 2008/0298724 A1 | 12/2008 | Liao et al. |
| 2009/0078595 A1 | 3/2009 | McKinley et al. |
| 2010/0092758 A1 | 4/2010 | Slovencik |
| 2010/0282824 A1 | 11/2010 | Kannankeril et al. |
| 2010/0330330 A1 | 12/2010 | Luca et al. |
| 2011/0041462 A1 | 2/2011 | Lin |
| 2011/0153527 A1 | 6/2011 | Smythe |
| 2011/0172072 A1 | 7/2011 | Wetsch et al. |
| 2011/0192121 A1 | 8/2011 | Kannankeril et al. |
| 2013/0303351 A1 | 11/2013 | Fu et al. |
| 2014/0087177 A1 | 3/2014 | Huang et al. |
| 2014/0261752 A1 | 9/2014 | Wetsch |
| 2015/0291335 A1 | 10/2015 | Wetsch |
| 2015/0314940 A1 | 11/2015 | Matta |
| 2016/0137383 A1 | 5/2016 | Wetsch et al. |
| 2017/0274588 A1* | 9/2017 | Maué ........................ B32B 5/14 |
| 2018/0093441 A1 | 4/2018 | Wetsch |
| 2018/0148246 A1* | 5/2018 | Fu .......................... B32B 29/02 |
| 2019/0031415 A1 | 1/2019 | Kumar |
| 2019/0062028 A1 | 2/2019 | Getty et al. |
| 2019/0225406 A1 | 7/2019 | Kim |
| 2019/0291907 A1 | 9/2019 | Wetsch et al. |
| 2020/0024049 A1 | 1/2020 | Borrero et al. |
| 2020/0115082 A1 | 4/2020 | Hess et al. |
| 2020/0270048 A1 | 8/2020 | Goodrich |
| 2022/0032598 A1 | 2/2022 | Wetsch |

FOREIGN PATENT DOCUMENTS

| | | |
|---|---|---|
| WO | WO-00/69747 A1 * | 11/2000 |
| WO | WO2012033998 A2 * | 3/2012 |
| WO | 2014015060 A2 | 1/2014 |
| WO | WO2014175792 A1 * | 10/2014 |
| WO | 2019140065 A1 | 7/2019 |

OTHER PUBLICATIONS

International Preliminary Report on Patentability International Application No. PCT/US21/44215, filed Aug. 2, 2021, dated Jan. 17, 2023.

* cited by examiner

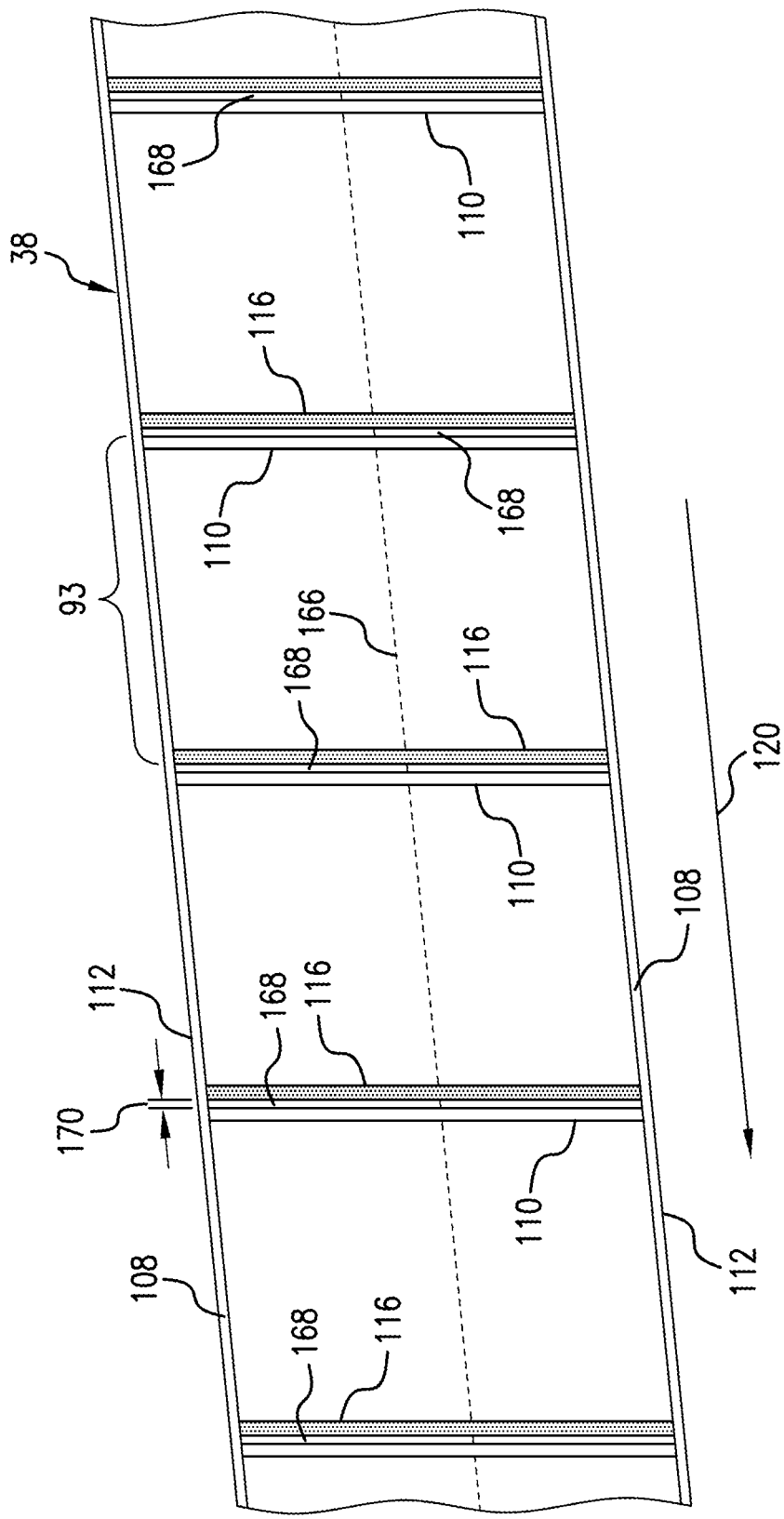

EXPANDABLE WEB WITH IN-SITU COMBINATION OF EXPANSION MATERIAL COMPONENTS

FIELD OF THE INVENTION

The present disclosure relates generally to packaging for shipping items. More specifically, the disclosure relates to systems and methods for making expansion walls for use in packaging for providing cushion to packaged objects.

CROSS-REFERENCE TO RELATED APPLICATION

The present application claims priority to U.S. Provisional Patent Application No. 62/706,110, filed Jul. 31, 2020, entitled "METHOD OF MAKING AN EXPANDABLE WEB." Suitable systems and methods of making protective packaging with an expandable web are disclosed in U.S. patent application Ser. No. 17/365,548, filed Jul. 1, 2021, titled "PACKAGING WITH SEALING MATERIALS HAVING DIFFERENT SEALING CONDITIONS"; U.S. patent application Ser. No. 17/365,892, filed Jul. 1, 2021, titled "BAGGER WITH PADDING EXPANSION"; and U.S. patent application Ser. No. 17/365,854, filed Jul. 1, 2021, titled "USER-EXPANDABLE PACKAGING", the content of which is herein incorporated by reference in their entirety.

BACKGROUND

Traditional low-density protective packaging is produced in standard bulky, low-density configurations. These bulky, low-density configurations may include, for example, pre-formed and inflated fluid chambers (e.g., bubble wrap), pre-expanded foam, the insertion of padding, etc. These bulky, low-density configurations provide packaging support during shipment. Before they can be used in packaging, however, they must be shipped to the packaging and shipment locations.

Protective wrap using an expandable adhesive are disclosed, for example, in U.S. Patent Application 2019/0062028. Additionally, containers having insulating, expandable insulation have been described, for example, in U.S. Pat. No. 10,183,458).

Since traditional protective packaging is produced already in bulky, low-density configurations, it must be transported as such. This increases the total volume of the packaging material even before it is used for packaging, thus increasing shipping costs of the packaging material to packaging and shipment locations and decreasing the amount of product that can be stored at these locations until use is needed.

For at least these reasons, systems and methods for producing packaging material in a low volume, high-density configuration which can then be expanded at a later time is needed.

Since traditional, as well as more recent, protective packaging is produced already in bulky, low-density configurations, it must be transported as such. This increases the total volume of the packaging material even before it is used for packaging, thus increasing shipping costs of the packaging material to packaging and shipment locations and decreasing the amount of product that can be stored at these locations until use is needed.

For at least these reasons, systems and methods for producing packaging material in a low volume, high-density configuration which can then be expanded at a later time is needed.

SUMMARY

According to various embodiments of the present disclosure, a method for making an expansion wall is provided. The method can include applying a matrix to a first ply and applying an expansion element to the surface of the matrix. In some embodiments, the expansion element is applied to the applied matrix. In some embodiments, a second ply is applied over the first ply to trap the matrix and expansion element therebetween. In some embodiments, the second ply is applied to form an expansion wall. In some embodiments, the applied expansion element is entrained into the applied matrix to provide an expansion material that is configured to expand to, and solidify in, an expanded condition upon activation. When the expansion material is expanded, it provides padding between the first and second plies. In some embodiments, the expansion element is selected such that the matrix and expansion material expand upon the activation of the expansion element, and the matrix is selected to solidify upon activation of the expansion element to provide the solidification of the expansion material.

In various embodiments, the first and second plies are squeezed together to entrain the expansion element into the matrix to force the expansion element into the matrix. When activated, the expansion element causes the matrix to expand, and may increase the spacing between the first and second plies.

In various embodiments, the expansion element comprises particulates that stick to the surface of the matrix upon application. In some embodiments, particulates that do not stick to the matrix during application can be collected by a vacuum device that is sufficiently strong to suck up particulates but not damage the first ply or the matrix having expansion element on its surface. In some embodiments, the collected particulates can be reapplied to the surface of additional matrix to provide additional matrix on the first ply with the collected particulates on its surface and the plies can be squeezed about the additional adhesive and reapplied particulates.

In various embodiments, application of the expansion element includes an applicator device that blows the expansion element in the general direction of the first ply and the matrix for randomized distribution. In some embodiments, the expansion element is applied to the matrix before the matrix applied to the first ply. In some embodiments, the expansion element comprises a plurality of microspheres containing a material that when activated exits the microspheres as a gas. In some embodiments, the matrix is a fluid. In some embodiments, the matrix is a starch-based adhesive.

In various embodiments, activation of the expansion element forms an expanded wall. In some embodiments, activation of the expansion element includes applying radiation. In some embodiments, activation of the expansion element is caused by a chemical reaction.

In some embodiments, the first and second plies comprise paper. In some embodiments, the first and second plies are formed when a single web of sheet material is folded along a fold line such that the first and second plies are on opposite sides of the fold line. In some embodiments, the first and second plies are formed from separate sheets of a single web of sheet material. In some embodiments, the first and second plies comprise longitudinal edges that align when the second ply is applied over the first ply.

In various embodiments, the method includes forming the expansion wall into a compact supply configuration. In some embodiments, forming of the expansion wall causes the entraining of the applied expansion material. In some embodiments, forming of the expansion wall includes rolling or fanfolding the expansion wall, to provide a supply of an expandable wall.

In various embodiments, the method includes forming regions of weakness extending transversely across one or both of the first and second plies and configured for facilitating separation of parts of the plies from each other.

In various embodiments, the method includes folding the expansion wall along a fold line to place a first side of the expansion wall against a second side of the expansion wall and sealing the first side of the expansion wall to the second side of the expansion wall to define an interior cavity therebetween configured to receive an object to be packaged. In some embodiments, activating the expansion element in the folded expansion wall forms a padded container comprising the interior cavity.

In various embodiments, applying the matrix comprises dispensing the matrix and applying the expansion element comprises dispensing the expansion element to apply the expansion element to the surface of the dispensed matrix as the dispensed matrix is travelling towards the first ply, such that the matrix is applied to the first ply with the expansion element on the surface thereof. In some embodiments, the matrix is dispensed by ejecting the matrix in a trajectory towards the first ply and the expansion element is applied to the ejected matrix as the matrix is travelling along the trajectory.

According to various embodiments of the present disclosure, a further method for making an expansion wall is provided. The method can include applying a matrix to a first ply, applying an expansion element to a surface of the applied matrix, and applying a second ply over the first ply to trap the matrix and expansion element therebetween. The matrix is selected such that after expansion, the expanded matrix solidifies to provide padding between the first and second plies. In some embodiments, the first ply with the applied matrix is moved using device, such that the expansion element is applied to the applied matrix on the moving ply. In some embodiments, the applied expansion element is entrained into the applied matrix. In some embodiments, the expansion element is activated to form an expanded-wall web.

According to various embodiments of the present disclosure, a device for producing an expansion-wall web is provided. The device includes a matrix applicator for applying a matrix to a first ply, an expansion element applicator to apply an expansion element onto the surface of the matrix, and an entrainment device for entraining the applied expansion element into the matrix, such that activation of the expansion element will cause the matrix to expand to and solidify in, an expanded condition. In some embodiments, the device includes an entrainment device for entraining the applied expansion element into the matrix, such that activation of the expansion element will cause the matrix to expand to and solidify in, an expanded condition. In some embodiments, the device includes an expansion activator that activates the expansion element and causes expansion of the expansion material.

According to various embodiments of the present disclosure, an expansion wall assembly is provided. The expansion wall assembly includes, a first ply and an expansion material applied to the first ply. The expansion material may include a matrix and an expansion element applied to the surface of the matrix such that the interior of the matrix is substantially free of expansion element. The expansion element causes the expansion material to expand to, and solidify in, an expanded condition. In some embodiments, a second ply is positioned over the first ply to trap the expansion member therebetween.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

FIG. 9A is a top view of an example of an expansion wall;

DETAILED DESCRIPTION

Figure 1:
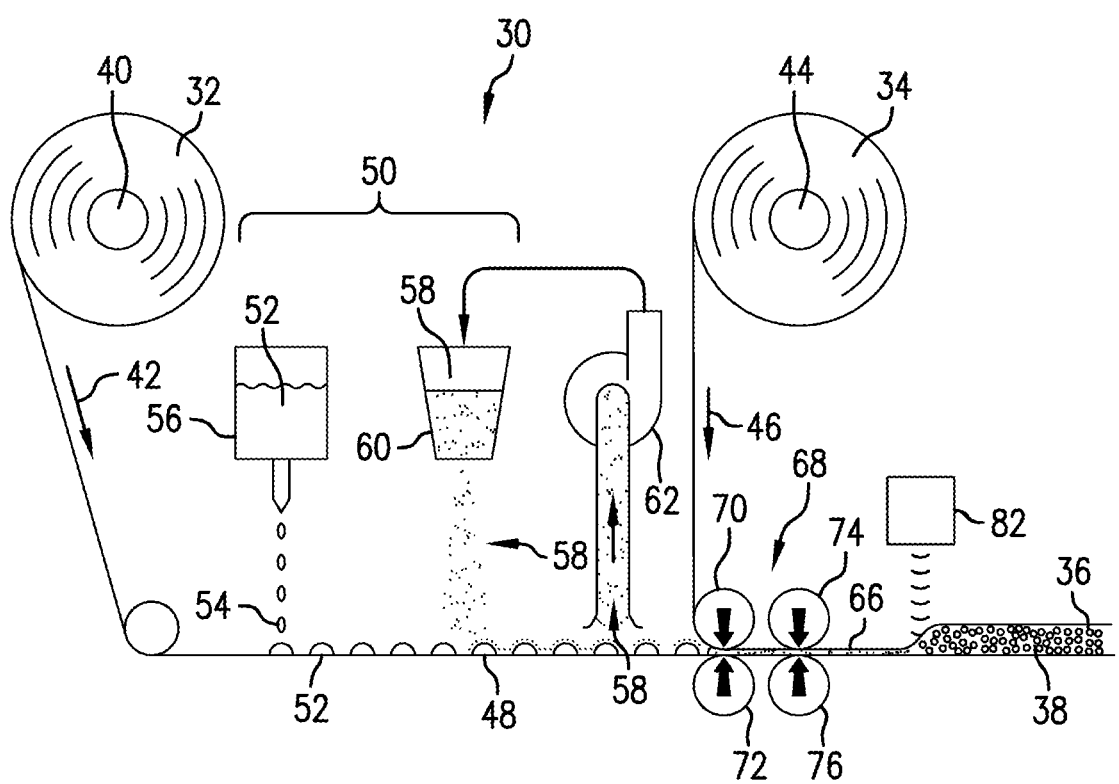
FIGS. 1-4 are side views of devices for producing an expansion wall in accordance with various embodiments.

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples can be utilized and other changes can be made without departing from the spirit or scope of the subject matter presented herein. It will be readily understood that the aspects of the present disclosure, as generally described herein and illustrated in the figures, can be arranged, substituted, combined, separated, and designed in a wide variety of different configurations, all of which are implicitly contemplated herein.

The present disclosure is related to systems and methods of producing packaging material. In some embodiments, the packaging material may include pads and sheets, which include a single wall. In some embodiments, the packaging material includes packaging units configured to cushion one or more objects during shipping. Packaging units can include, for example, pads and packaging containers. Packaging containers include a plurality of walls enclosing an interior cavity for storing one or more products. In some embodiments, packaging containers include bags and envelopes, such as mailers, which may be fabricated and then filled with an item to be shipped at a later point in time. An example where this material can be used is in the bagger of U.S. application Ser. No. 16/599,679, which contents is incorporated in its entirety in this application.

Some embodiments of the present disclosure include expansion walls. Some expansion walls include expandable walls, which are in an unexpanded configuration and can be expanded at a later time. Some expansion walls include expanded walls, which are already in an expanded configuration. Expansion walls may include one or more expansion materials configured to expand the expansion wall. Some expansion materials include expandable material configured to expand with the application of one or more expansion conditions such as, e.g., heat or chemical reaction, or other suitable means.

Conversion Devices

Now referring to FIG. 1, a device 30 is shown for converting sheet material 32, 34 into a supply of expansion-wall webs or expansion walls 38 that is expandable into a supply of expanded walls 36. The expansion walls 38 include a first ply 32 and a second ply 34. The first ply 32 is fed from a stock support 40, in direction 42, and the second ply 34 is fed from stock support 44, in direction 464, such that the second ply 34 will overlay the first ply 32. An expansion material 48 is applied to the first ply 32 by an expansion material applicator 50, to generate an expansion wall assembly, prior to the addition of the second ply 34. The expansion material 48 incudes a matrix 52 that is applied as droplets 54 onto the first ply 32, dispensed or ejected by a matrix applicator 56 and an expansion element 58 which is applied by the expansion element depositor 60. The expansion material applicator 50 includes the matrix applicator 56 and the expansion element depositor 60. The matrix 52 could also be applied in other patterns, such as lines or shapes, described in more detail below. In some embodiments, the matrix 52 and expansion element 58 are not pre-mixed.

In some embodiments, the matrix 52 and expansion element 58 are applied to the first ply 32 when the first ply 32 is moving through the device 30. In some embodiments, the matrix 52 and expansion element 58 are applied to the first ply 32 when the first ply 32 is stationary. In one embodiment, the expansion element 58 is deposited onto the first ply 32 and the surface of the matrix 52 in a random, unfocussed manner, after the matrix 52 has been deposited onto the first ply 32, as depicted in FIG. 1. In this case, the expansion element 58 will stick to at least part of the surface of the matrix 52, leaving the interior of the matrix 52 substantially free of expansion element 58, and any expansion element 58 that is not deposited onto the surface of the matrix 52 is then collected or recaptured and recycled back into the expansion element depositor 60 by a recapture device 62, such as a vacuum, and reapplied to the first ply 32 and matrix 52. The recapture device 62 is configured such that it is strong enough to suck up the free expansion element 58, without damaging the first ply 32, or matrix 52 with the expansion element 58 already stuck to its surface.

Figure 2:
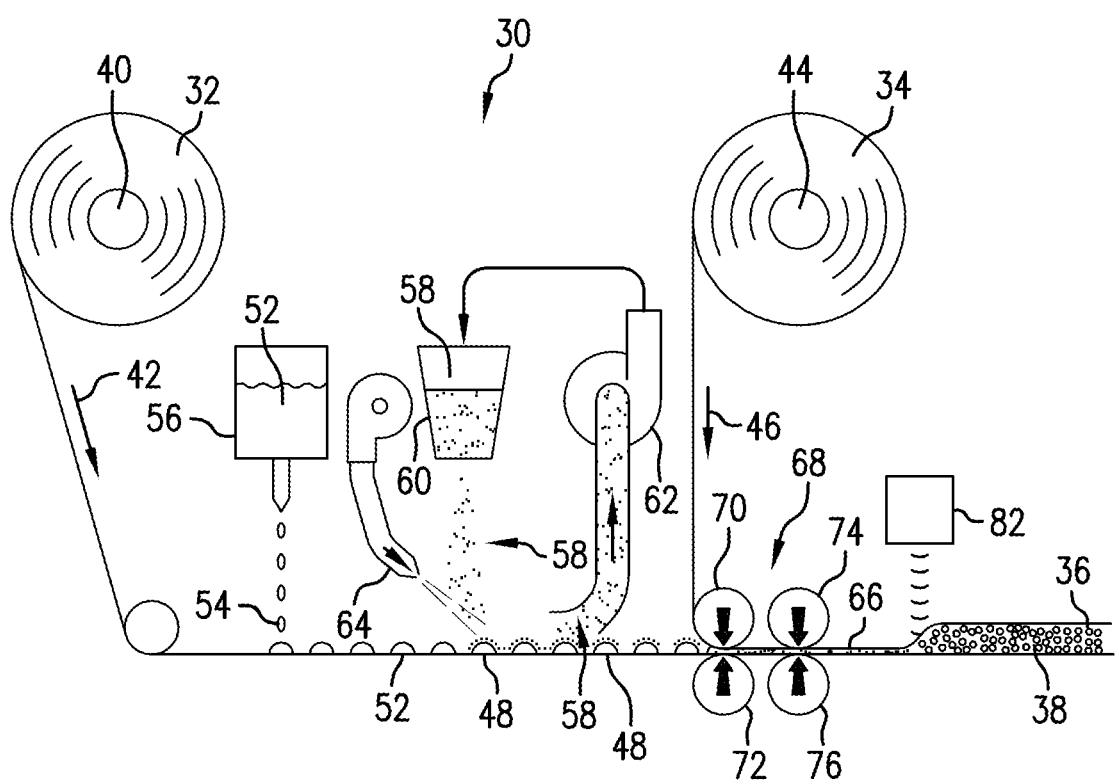
Figure 3:
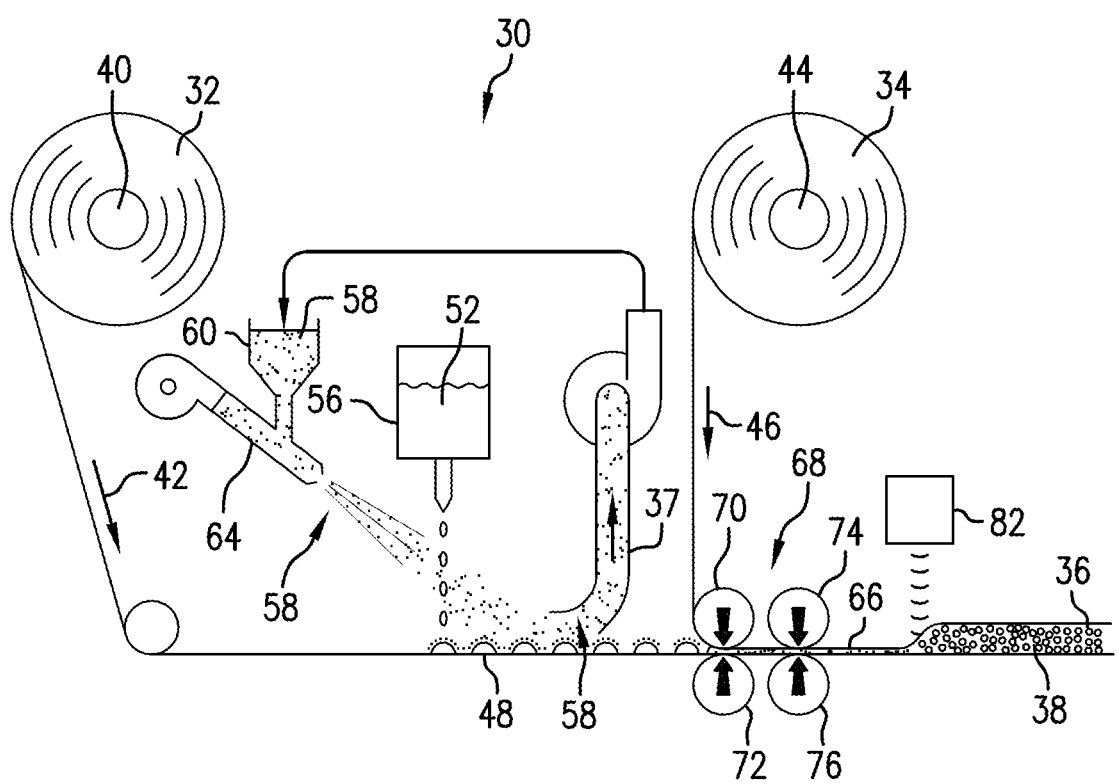

In other embodiments, such as those shown in FIGS. 2 and 3, the device 30 may include an expansion element director 64, such as an air knife or blower. The expansion element director 64 can be used to direct and distribute the flow of expansion element 58, for example, towards the first ply 32 and onto the matrix 52, already deposited onto the first ply 32, as is the case in FIG. 2. In another embodiment, the expansion element director 64 can be used to direct the flow of expansion element 58, directly onto the surface of the matrix 52, before it deposited into the first ply 32, as shown in FIG. 3, such that the matrix 52 is ejected in a trajectory towards the first ply 32 and the expansion element 58 is combined with the air stream of the air knife, and the air stream of the air knife is directed into the trajectory of the matrix 52 prior to it reaching the first ply 32. In further embodiments, the expansion element 58 is applied to the first ply 32 prior to the matrix 52 being applied such that the expansion element 58 is positioned between the first ply 32 and the matrix 52.

In some embodiments, the expansion element depositor 60 and the expansion element director 64 may be combined such that the expansion element 58 is directed as it leaves the depositor 60. In other embodiments, the expansion element depositor 60 and the expansion element director 64 may be separate, such that the expansion element 58 is directed after it has exited the depositor but prior to being deposited onto the matrix 52 or the first ply 32.

Figure 4:
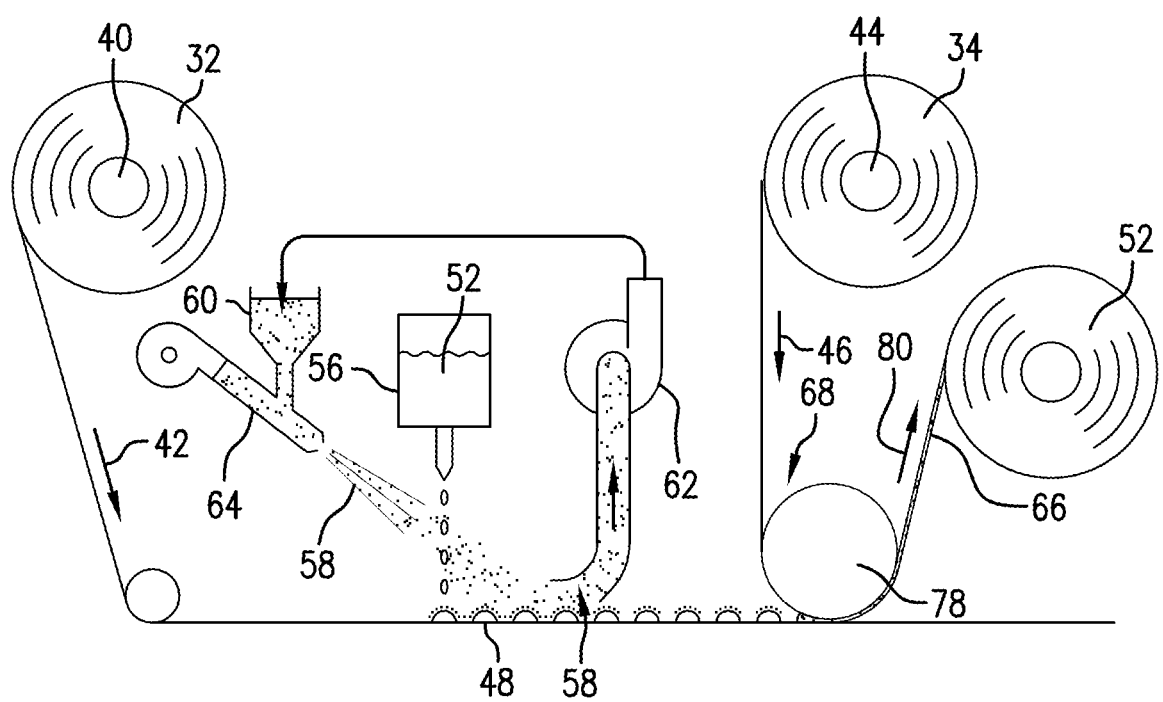

In some embodiments, after the expansion material 48 has been applied to the first ply 32, a second ply 34 is then applied on to the first ply 32, to form an expandable wall 66, including the matrix 52 and expansion element 58 trapped between the first and second plies 32, 34. The matrix 52 and the expansion element 58 that make the expansion material 48 are combined in-situ on or between the plies 32, 34, such as by entraining, mixing, or other suitable methods. In some embodiments, the expansion element 58 is entrained into the matrix 52 by an entrainment device 68. The entrainment device 68 may include sets of rollers 70, 72, 74, 76, as shown in FIGS. 1-3, that apply pressure on either side of the expansion wall 38, or a single roller 78 that the expansion wall 38 is pulled around in direction 80 to cause tension pressure on the wall, as shown in FIG. 4. In some embodiments, entrainment occurs when the expansion wall 38 is rolled onto a supply roll configuration 84. The pressure applied to the expansion wall 38 by rollers 70, 72, 74, 76, 78, or the supply roll 84, causes the first and second plies 32, 34, to squeeze together and to flatten and compress the matrix 52 and force the expansion element 58 into the surface of the matrix 52, forming a high-density expandable wall 66. In other embodiments, different entrainment devices may be used that cause the expansion element 58 to enter through the surface of the matrix 52. Other entrainment devices 68 or methods of combining the matrix 52 and expansion element 58 may include vibration, agitation, or heating the expansion element 58, for example. In some embodiments, the expansion element 58 is not entrained into the matrix 52 but remains on the surface of the matrix 52. In some embodiments, a second ply 34 is not applied prior to entrainment of the expansion element 58 into the matrix 52.

In some embodiments, as shown in FIGS. 1-3, the expansion element 58 in the expandable wall 66 is activated by an expansion device 82 to cause expansion of the expansion material 48, which causes the matrix 52 to foam and expand to generate an expanded wall 36. The expansion device 82 may provide thermal and/or mechanical and/or chemical activation, and/or can provide other suitable initiating properties for activating the expansion element 58. For example, the expansion device 82 can provide one or more of heat, pressure, agitation, a chemical reaction and/or other suitable expansion activators.

In other embodiments, as shown in FIG. 4, the expandable wall 66 is not expanded, but consolidated in a compact, unexpanded, high-density supply configuration, forming a web stock of packaging material. According to some embodiments, the unexpanded, high-density supply configuration can be rolled into a supply roll configuration, such as is illustratively depicted in FIG. 4. The roll configuration 84 can be a cored roll configuration or coreless roll configuration. Another suitable high-density supply configuration is obtained by folding the expandable wall 66 into a fanfold stack configuration that has opposing folds 86, such as a fanfold (e.g., accordion) configuration 85 (such as is illustratively depicted in FIG. 7), and/or other suitable configurations. Another suitable high-density supply configuration is a series of two or more stacked expandable walls 66.

Figure 5:
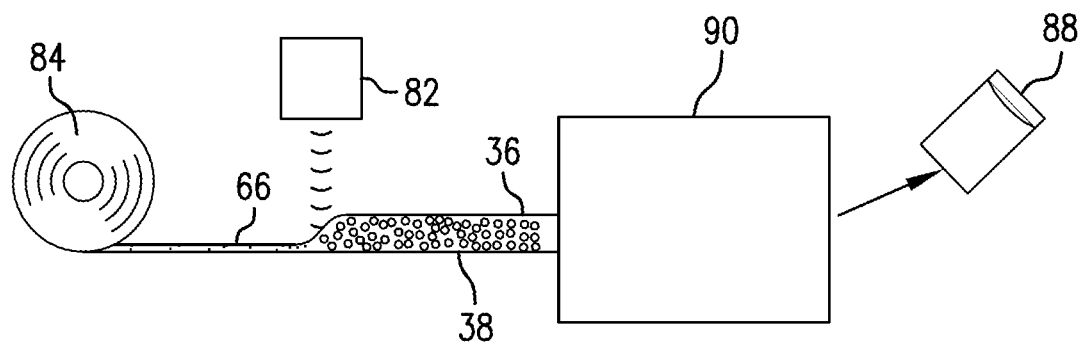
FIGS. 5 and 6 are side view of devices for producing expanded packaging using an expansion wall, for example as produced by the embodiments of FIGS. 1-4.
Figure 6:
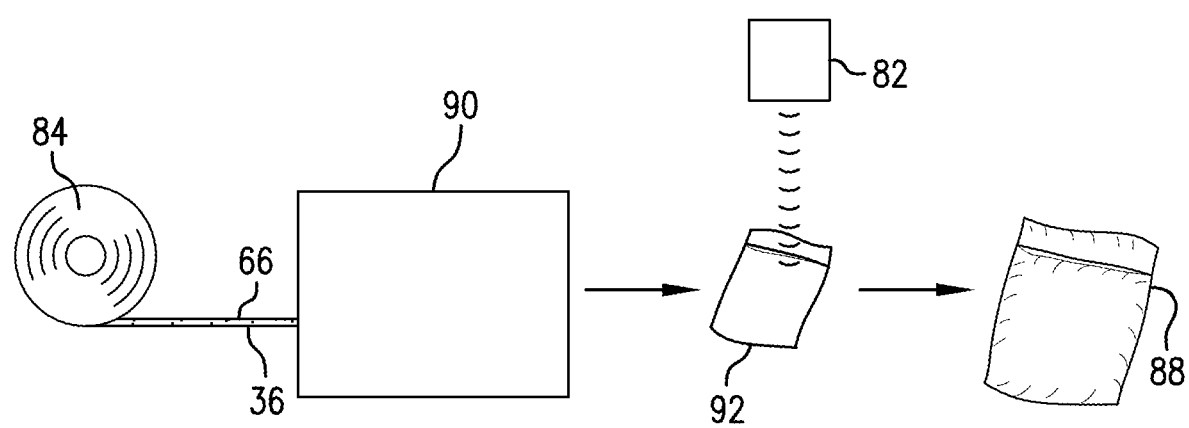

As illustrated in FIGS. 5 and 6, the expansion wall may be further processed into packaging 88 by a packaging formation device 90. In some embodiments, the packaging can be made from expanded wall 36, as seen in FIG. 5, to generate expanded packaging such as padded container or a padded mailer 88. In some embodiments, the packaging can be made from expandable wall 66 as seen in FIG. 6. If the packaging is made from expandable wall 66, the packaging will be in a high-density configuration 92 and can be efficiently stored or transported before it is expanded using an expansion device 82 to form expanded packaging such as a padded mailer 88.

Figure 7A:
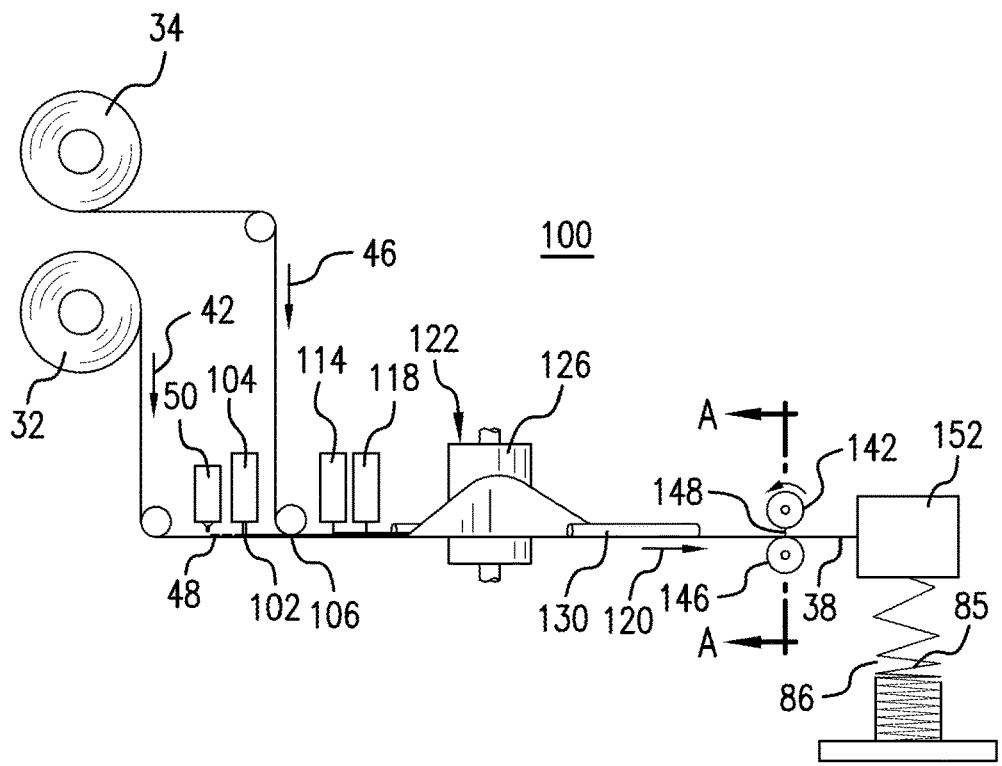
FIGS. 7A and 7B are side and top views, respectively, of a system for converting stock material into a supply chain of separable packaging containers constructed, for example as shown in FIG. 9B.
Figure 7B:
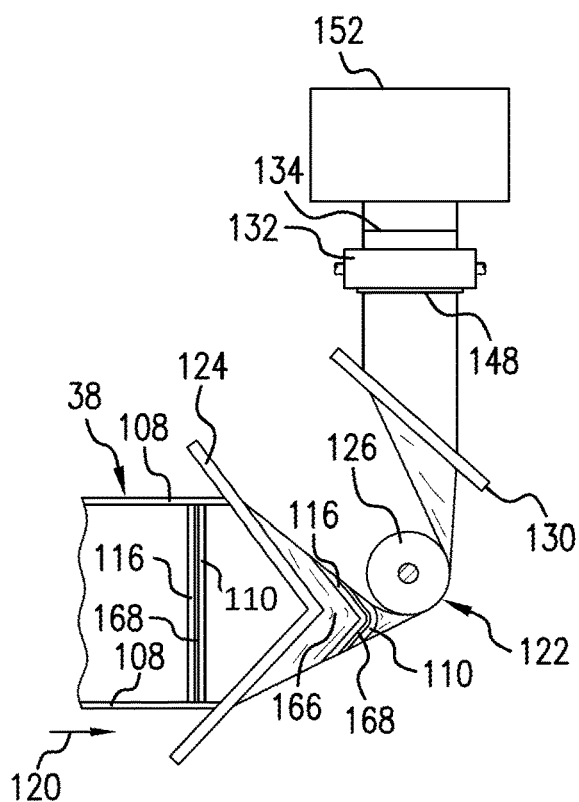

Now referring to FIGS. 7A and 7B, a system 100 for converting stock material into supply chain of packaging containers is shown. The expansion wall includes a first ply 32 and a second ply 34. The first ply 32 is fed, in direction 42, and the second ply 34 is fed, in direction 46, and the first ply 32 is joined to the second ply 34. An expansion material 48 is applied to the first ply 32, using an expansion material applicator 50 that dispenses the expansion material 48, that may include the matrix applicator 56 and the expansion element depositor 60 described above, and one or more sealing materials 102 are applied to the first ply 32, using a sealing material applicator 104. After the expansion material 48 and the sealing material 102 are applied, the first ply 32 and the second ply 34 are joined. The joining can include applying pressure using a pressure applicator 106 configured to apply pressure to the first ply 32 and the second ply 34.

After the first ply 32 and the second ply 34 are joined, one or more exterior sealing materials are applied to the exterior of the expansion wall 38, forming one or more exterior seals 108, 110 (shown in further detail in FIG. 9A). One or more longitudinal seals 108 are applied to the outer longitudinal edges 112 of the expansion wall 38, using a longitudinal seal applicator 114, and one or more transverse seals 110, 116 are applied between the one or more longitudinal seals 108, using a transverse seal applicator 118. The expansion wall 38 is then fed, in direction 120, through a folding apparatus 122 which folds the expansion wall 38.

The folding apparatus 122 includes folding mechanism 124 (for example, a folding bar 124). A tension mechanism 126 (for example, a wheel) applies tension to the expansion wall 38, causing the folding bar 124 to fold the expansion wall 38 along the shape of the folding bar 124. The folding mechanism 124 can be a V-shaped folding bar or other suitable folding shape. For example, in some alternative embodiments, the folding mechanism 124 includes a plurality of bends.

The expansion wall 38 is folded along folding edge 128. The folding apparatus 122 includes a flattening mechanism 130 configured to flatten the expansion wall 38 once folded by the folding mechanism 124. The flattening mechanism 130 is a flattening bar configured to apply pressure to, and flatten, the expansion wall 38. The expansion wall 38 is then sealed along the one or more longitudinal seals 108, using a sealing apparatus. The flattening mechanism functions 130 can function as a sealing apparatus. In other embodiments, the system 100 can alternatively incorporate a separate sealing apparatus. The sealing apparatus is configured to apply heat, pressure, and/or other suitable means of activating the one or more longitudinal seals 108.

The system 100 includes a cutting apparatus 132. The cutting apparatus 132 is configured to form one or more regions of weakness 134 and an opening 136 in the expansion wall 38. The one or more regions of weakness 134 are configured to aid in separating the expansion wall 38 into one or more separate packaging elements (e.g., one or more packaging containers). The opening 136 is configured to enable access an interior cavity 138 of each of the one or more packaging containers 140. The opening 136 can be a slit. In other embodiments, the opening 136 is not completed cut open by the cutting apparatus 132 and is configured to be torn open. It is noted that the one or more regions of weakness 134 and/or the opening 136 can be formed prior to or subsequent to consolidation of the expansion wall 38. The cutting apparatus 132 includes an upper compression roller 142 and a lower compression roller 144. The upper compression roller 142 includes a series of teeth 146 configured to puncture the expansion wall 38, forming a region of weakness 134 transverse to the longitudinal edges of the folded expansion wall 38. The lower compression roller 146 can include a rigid surface, an elastomer, or other suitable material. In some embodiments, the cutting apparatus includes one or more blades, heat-cutters, and/or other suitable means of cutting one or more portions of the expansion wall 38.

The expansion wall 38 includes one or more regions of weakness 134 that extend transversely (e.g., generally perpendicularly) to the longitudinal direction at one or more of the longitudinal edges. In other embodiments, the regions of weakness 134 are alternatively placed elsewhere along the transverse direction of the expansion wall 38. The regions of weakness 134 can be provided by perforation, scoring, or other suitable technique for weakening the material at the desired locations such as to make separation of the individual envelope sections easier. A region of weakness 134 can be provided between each pair of adjacent packaging container formations 140, thereby allowing the individual packaging container formations 140 to be separated. The regions of weakness 134 can be provided within the perimeter of transverse seals 110, 116. The regions of weakness 134 can be through both plies 32, 34, or, alternatively, through one ply. The expansion wall 38 can include one or more slits configured to aid in the separation of adjacent packaging container formations 140.

In order to prevent the expansion material 48 from escaping from a packaging container formation 140 (particularly when chemical reactions are used to expand the expansion material), the transverse seals 148 of the first ply 32 and the transverse seals 150 of the second ply 34 can be positioned such that they encompass a region before and after the regions of weakness 134. The expansion wall 38 can include one or more slits at the longitudinal edges of the expansion wall 38 to aid in separation.

The system 100 includes a consolidating apparatus 152 configured to consolidate the expansion wall 38 into an unexpanded, high-density configuration such as, e.g., a roll configuration 84, a fanfold stack configuration 85, and/or other suitable configurations. The consolidation apparatus 152 is configured to bend, roll, and/or otherwise alter the shape of the expansion wall 38 into the consolidated, unexpanded, high-density configuration. In other embodiments, the consolidation apparatus may also include an expansion device 82, such that the expansion wall 38 is formed into an expanded, low-density configuration.

It is noted that the expansion material 48 and/or the sealing material 102 can be applied to the first ply 32 and/or the second ply 34.

Sheet Material

As discussed above, the webs of sheet material of the expansion wall 38 can include a first ply 32 and a second ply 34. The first ply 32 and the second ply 34 may be separate sheets of sheet material or they may come from the same sheet of sheet material folded in two. One or more of the plies can include paper (e.g., cardboard, kraft paper, fiberboard, pulp-based paper, recycled paper, newsprint, and coated paper such as paper coated with wax, plastic, water-resistant materials, and/or stain-resistant materials), plastic, cellulose, foil, poly or synthetic material, biodegradable materials, and/or other suitable materials of suitable thicknesses, weight, and dimensions. The plies can include recyclable material (e.g., recyclable paper). The expansion material 48 can be positioned between the first ply 32 and the second ply 34. When applied, the expansion material 48 is in an unexpanded configuration.

Figure 8:
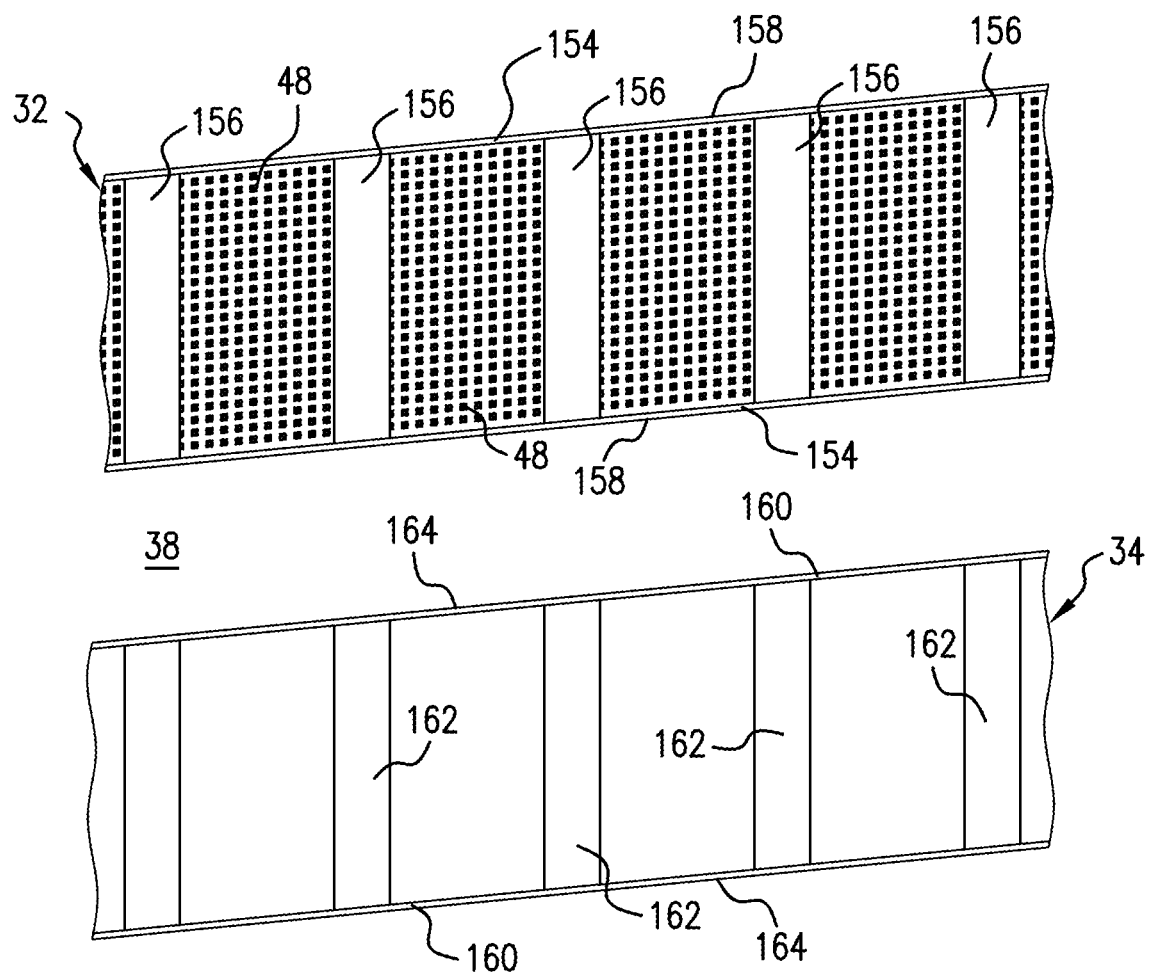
FIG. 8 is a top perspective view of an embodiment of plies used to form an expansion wall.

Referring to FIG. 8, expansion wall 38 includes a first ply 32 and a second ply 34. In some embodiments, the first ply 32 includes one or more seals 154, 156 formed or applied thereon, which may include a sealing material. In some embodiments, the one or more seals 154, 156 include one or more longitudinal seals 154 adhered along one or more longitudinal edges 158 of the first ply 32. The one or more seals 154, 156 may additionally or alternatively include one or more transverse seals 156. In some embodiments, the one or more transverse seals 156 extend to one or more of the longitudinal edges 158 of the first ply 32. In other embodiments, the transverse seals 156 extend across a portion of the first ply 32.

In some embodiments, the second ply 34 includes one or more seals 160, 162 including a sealing material. The one or more seals 160, 162 may be configured to compliment the seals 154, 156 of the first ply 32, and include one or more longitudinal seals 160 adhered along one or more longitudinal edges 164 of the second ply 34. The one or more seals 160, 162 of the second ply 34 include one or more transverse seals 162. The one or more transverse seals 162 extend to one or more of the longitudinal edges 164 of the second ply 34. In other embodiments, the one or more transverse seals 162 extend across a portion of the second ply 34.

Expansion Material

As discussed above, the expansion material 48 includes a matrix 52 and an expansion element 58, which can be expanded by an expansion device 82. Prior to expansion of the expansion material 48, when the expansion material is still in an expandable condition (i.e., when the expansion material 48 is an expandable material), the matrix 52 can be fluid, such as a viscous gel or liquid. This allows ready application onto the plie(s) 32, 34. In other embodiments, the expandable material is provided as a solid, and/or may go through a gel or fluid phase. For example, the solid matrix may be formed from particulates that allow the expansion elements to be entrained into the matrix 52. The expansion device 82 can provide one or more of thermal and/or mechanical and/or chemical activation and/or can provide other suitable initiating properties for activating the expansion element 58. For example, the expansion device 82 can provide one or more of heat, pressure, a chemical reaction and/or other suitable expansion initiators to activate the expansion element 58. In some embodiments, the expansion device 82 provides radiation, such as microwave or radiofrequency radiation, which will generate heat to activate the expansion element 58. The expansion element 58 can include reactive components, chemical catalysts, blowing agents, heating agents (which can apply heat to the expansion material and/or cause the expansion material to increase in temperature) and/or other suitable expansion elements. In some embodiments, the expansion element 58 is maintained separate from the matrix 52 by a barrier, and for this purpose can be maintained within another structure such as, for example, microsphere shells. The expansion material 48, once expanded, provides a cushion configured to provide protection to one or more items/products/etc. positioned against the first ply 32 or the second ply 34.

In some embodiments, when activated, the expansion element 58 can cause the expansion material 48 to expand to between about 3 and about 200 times, between about 20 and 150 times, or between 50 and 100 times its volume. In some embodiments, when activated, the expansion element can cause the expansion material 48 to expand to about 3 times its volume, about 5 times its volume, about 10 times its volume, to about 25 times its volume, to about 50 times its volume, to about 100 times its volume, to about 150 times its volume, or to about 200 times its volume.

In some embodiments, the matrix 52 can include one or more polymers including emulsion-based polymers. The one or more polymers can include one or more of vinyl acetate ethylene, polyvinyl acetate, polyvinyl alcohol, polyvinyl acetate copolymers, polyvinyl alcohol copolymers, dextrin stabilized polyvinyl acetate, vinyl acetate copolymers, ethylene copolymers, vinylacrylic, styrene acrylic, acrylic, styrene butyl rubber, polyurethane, polyolefins, biodegradable materials (e.g., cellulose and starch), and/or other suitable expansion materials.

In some embodiments, the matrix 52 can include a polyolefin based adhesive or a polyolefin dispersion. The polyolefin dispersion can include polyethylene and/or polypropylene, thermoplastic polymers, polymeric stabilizing agents including at least one polar polymer, water, and/or other suitable polyolefin dispersions. A suitable polyolefin dispersion can include, for example HYPOD™, from Dow Chemical, or other suitable polyolefin dispersions.

In some embodiments, the matrix 52 is a water-based adhesive. The water-based adhesive may include a water-based polymer.

In some embodiments, the matrix 52 is based on starch in its natural or synthetic forms. In some embodiments, the starch is in the form of a ground up micro-starch powder. The diameter of the ground up starch particles is between about 12 microns to about 20 microns. In some embodiments, the starch-based matrix comprises one or more of water or other solvent, a surfactant, polar bonding agent, or other fillers. In some embodiments, for example, the matrix 52 comprises up to 50% water. In some embodiments, the matrix 52 comprises 30-40% starch for example.

Some embodiments include a barrier that separates the expansion element 58 from the matrix 52. A type of suitable barrier is a microsphere shell that contains a blowing agent, chemical catalyst, or chemical reactive component as the expansion element. Other types of barriers can alternatively be used.

In some embodiments, the expansion element 58 comprises a plurality of microspheres that are expandable and/or rupturable, for example upon the application of sufficient heat. The microspheres can include an outer shell and an inner core. Suitable outer shells can include, for example, one or more of a thermoplastic polymer such as polyacrylonitrile or PVC, as well as glass, rubber, starch, cellulose, ceramic, or other suitable material. In some embodiments, the plurality of heat-expandable microspheres include a solid, liquid or gas core made from one or more of a hydrocarbon, water, or other suitable chemical that can be activated to expand or rupture the microsphere shell. In some embodiments, the microspheres can include biodegradable materials such as, for example, cellulose.

The expansion element 58, such as the microspheres, can be mixed with the matrix 52 prior to application on the first ply 32, or provided on the matrix 52 after the matrix 52 has been applied to the first ply 32, by mixing or entraining the microspheres into the matrix 52 after application to the first ply 32, for example when the plies 32, 34 are pressed together.

In some embodiments, the microspheres have an expansion temperature (Texp), at which the microspheres begin to expand, and a maximum temperature (Tmax), whereby, if the microspheres are heated above Tmax, they will rupture. The Texp of the microspheres is not particularly limited, but is generally between about 60° C. and up to about 250° C. The Tmax of the microspheres is generally between about 80° C. and up to about 300° C. In some embodiments, the Tmax is higher than 300° C. The microspheres are selected based on their maximum expansion temperature, depending on whether the microspheres are required to rupture or not. The Tmax is dependent on several properties, including the physical properties of the microspheres, the physical properties of the matrix 52, as well as the physical properties of the plies on which the matrix 52 and microspheres are deposited. The heat can be generated via suitable means such as, for example, radiofrequency radiation or other suitable means. In some embodiments, the radiofrequency radiation is applied to the expansion material 48 at frequencies of approximately 10-45 MHz or as appropriate for the microsphere composition and the material of the matrix 52. In other embodiments, other frequencies may be used. The heating parameters selected are dependent upon the expansion material or materials 48 used. Suitable microspheres are known in the art.

In some embodiments, the expansion element 58 includes a blowing agent such as a gas or a mixture of gases. Examples of suitable gases include air, carbon dioxide, nitrogen, argon, helium, methane, ethane, propane, isobutane, n-butane, neo-pentane, and the like. In some embodiments, the gas or mixture of gases are added to the expansion material 48 by mechanical means. Examples of mechanical means include whisking or frothing the expansion material 48 to beat the air or other gases into the expansion material and increase its volume. In other embodiments, the gas or mixture of gases can also be encapsulated in microspheres. When the microspheres are activated, they expand and may rupture. The expansion of the microspheres causes expansion of the expansion material 48. The rupture of the microspheres releases their contents, resulting in foaming and expansion of the expansion material 48. In some embodiments, the expansion wall 38 includes one or more vents or venting openings configured to enable gas (e.g., water vapor) produced by the application or expansion of the expansion material 48.

In some embodiments, the expansion element 58 includes one or more reactive components which cause chemical reactions to expand the matrix 52. Chemical reactions can include the mixing of two reactive components, that react to generate a foam. In some embodiments a catalyst is used to increase the rate of the chemical reaction. In some embodiments, the two reactive components are separated by a barrier prior to mixing and expansion. The barrier separating the reactive components can be the shell of a microsphere, wherein the core of the microspheres comprises one or more reactive components and rupturing of the microsphere releases its contents into one or more other reactive components, causing a foam generating reaction. Other barriers may also be used such as walls, capsules, or other barrier forming containers. Examples of reactive components that cause expansion include mixing a liquid form of isocyanate with a multi-component liquid blend called polyurethane resin. In this case, either the isocyanate or the polyurethane may be the matrix 52 or the expansion element 58 with a barrier separating them, such that activation will lead to removal or penetration of the barrier, and combination of the components. When combined, these components release carbon dioxide and water vapor to generate a polyurethane foam. Other reactive components can be used that form a foam upon mixing.

In some embodiments, when the expansion material 48 is expanded it solidifies, although other in embodiments, the expansion material 48 forms a gel or has another physical phase depending on the construction of the article. The expanded expansion material 48 is configured to form a region of protective padding and/or insulation (e.g. thermal and/or noise insulation). The method of solidification of the expansion material 48 is selected based on its physical properties, and may be achieved by such methods as thermosetting, drying (such as air drying), curing, or by other suitable processes, such as know methods to transition a material from fluid to solid. For example, a thermoset plastic may be irreversibly solidified by curing, whereas solidification of a thermoplastic can be reversible.

In some embodiments the expansion material 48 is applied in a pattern. The pattern, distribution, and/or concentration of the expansion material 48 is selected to attain desired padding and/or insulative characteristics. In this embodiment, the expansion material 48 is applied in a pattern of droplets 54. The droplets 54 can be dots, squares, circles, large and/or small shapes or polygons. Other suitable patterns can alternatively be employed, such as, for example, lines, arcs, circles, ellipses, squares, rectangles, polygons, or a combination thereof. The expansion material 48 is applied over a part of a surface of one or more of the plies 32, 34 of the expansion wall 38. Alternatively, the expansion material 48 can be applied over all of the surface of one or more of the plies 32, 34. In this embodiment, the expansion material is applied in a relatively uniform thickness. Other thicknesses, such as variable thicknesses can alternatively be employed. In some embodiments, lines of the expansion wall 38 can be left free of expansion material 48 to form natural hinge lines or regions that are more easily bent than other regions in which the expansion material 48 is expanded. In some embodiments, pressure is applied to the expansion material 48 during or subsequent to expansion, forming hinge lines or regions that are more easily bent than other regions.

Packaging Material

The packaging material described herein may include webs of expansion walls 38 and sheets that include single or multiple expansion walls having transverse seals 110, 116 that define individual packaging units 93. The packaging units may include pads having a single expansion wall 38, or packaging containers 88, 92 having a plurality of expansion walls 38. The packaging containers 88, 92 can include bags or mailers, which may be in a high-density unexpanded configuration 92, or a low-density expanded configuration 88, such as a padded mailer. The pads or packaging containers can be shipped to the user in a high-density unexpanded configuration and expanded by the user later, or the pads or packaging containers can be shipped to the user in a low-density expanded configuration.

In some embodiments, after the expansion wall 38 is formed with the expansion material 48 on the first and/or second plies 32, 34, one or more exterior sealing materials may be applied to the exterior of the expansion wall 38, forming one or more exterior seals 108, 110, 116 (as shown in FIG. 9A). One or more longitudinal seals 108 are applied to the outer longitudinal edges 112 of the expansion wall 38, and one or more transverse seals 110 are applied between the one or more longitudinal seals 108. The expansion wall 38 is then fed, in direction 120 (as shown in FIG. 7A), through a folding apparatus which folds the expansion wall 38. In this embodiment, the expansion wall 38 is folded along a folding edge 166. In other embodiments, the expansion wall 38 alternatively has a plurality of folding edges 166.

The expansion wall 38 may include one or more exterior longitudinal seals 108 and one or more transverse seals 110, 116. Transverse seals 110 form the bottom seal of one or more packaging containers 88, 92. In this embodiment, transverse seals 116 are configured to seal closed an opening in the packaging container 88, 92 subsequent to a product being inserted into an interior cavity of the packaging container 88, 92. According to this embodiment, transverse seals 110, 116 are of differing seal types. In this embodiment, one or more of transverse seals 110, 116 are of a different seal type as the one or more longitudinal seals 108. In other embodiment, one or more of transverse seals 110, 116 are alternatively of a similar seal type as the one or more longitudinal seals 108. According to some embodiments, the one or more longitudinal seals 108 can, in some embodiments, form a seal at a temperature different from a temperature required to form a seal using the one or more transverse seals 110, 116. This enables seals that are activated at one temperature to be activated at a time different from an activation time of one or more seals that are activated at other temperatures. In some embodiments, each of seals 108, 110, 116 can be heat-activated seals.

The packaging container 88, 92 may include one or more webs or expansion wall 38 layers having a surface that includes first and second regions, wherein, when corresponding first regions (corresponding, e.g., in FIG. 9A, to the regions upon which seals 108, 110 are positioned) are overlaid with each other and corresponding second regions (corresponding, e.g., in FIG. 9A, to the regions upon which seals 116 are positioned), are overlaid with each other, the overlaid first and second regions cooperatively surrounding a cavity 138 defined between the at least one expansion wall 38 layer. The expansion wall 38 may include a first sealing material disposed in the first region and configured to seal together the corresponding first regions of the at least one expansion wall 38 layer upon application of first conditions to the first sealing material. The expansion wall 38 may include a second sealing material disposed in the second region and configured to seal together the corresponding second regions of the at least one expansion wall 38 layer upon application of second conditions to the second sealing material. The second sealing material is configured such that the first conditions applied to the second sealing material are insufficient to cause the second sealing material to seal. In some embodiments, the first and second sealing materials are different materials. The corresponding first regions are sealed to each other by the first sealing material, and the second sealing material is in an unsealed condition, forming an opening to the interior cavity 138, the opening being configured to receive the object into the interior cavity. In some embodiments, the second sealing material is configured to seal closed the opening. In some embodiments, the corresponding first regions are sealed to each other and the corresponding second regions abut each other. In some embodiments, the at least one expansion wall 38 layer includes a longer expansion wall 38 layer and a shorter expansion wall 38 layer, the second region of the longer expansion wall 38 layer is positioned on the longer expansion wall 38 layer in a direction facing the interior cavity 138, and the second region of the shorter expansion wall 38 layer is positioned on the shorter expansion wall 38 layer in a direction facing outwardly from the interior cavity 138.

In some embodiments, the one or more longitudinal seals 108 and the one or more transverse seals 110, 116 include sealing material configured to establish a seal without the application of heat. For example, the one or more longitudinal seals 108 and the one or more transverse seals 110, 116 include a pressure-activated adhesive, a cold glue (e.g., a collagen-based glue, a Polyvinyl Acetate-based glue, or other suitable glues), and/or other suitable sealing materials. This prevents the expansion material 48 from activating and expanding while activating either the one or more longitudinal seals 108 and/or the one or more transverse seals 110, 116.

In this embodiment, the one or more transverse seals 110, 116 are provided at longitudinally spaced apart locations of the expansion wall 38 and extend substantially fully transversely across the expansion wall 38 between the longitudinal edges 112 of the expansion wall 38. In other embodiments, one or more of the transverse seals 110, 116 alternatively extend over a portion of the transverse length of the expansion wall 38. Transverse seals 110, 116 are separated by a gap 168 separated by distance 170. According to some embodiments, the gap 168 is configured to act as a vent in order to vent one or more gasses produced via the expansion and solidification process of the expansion material 48.

Figure 9B:
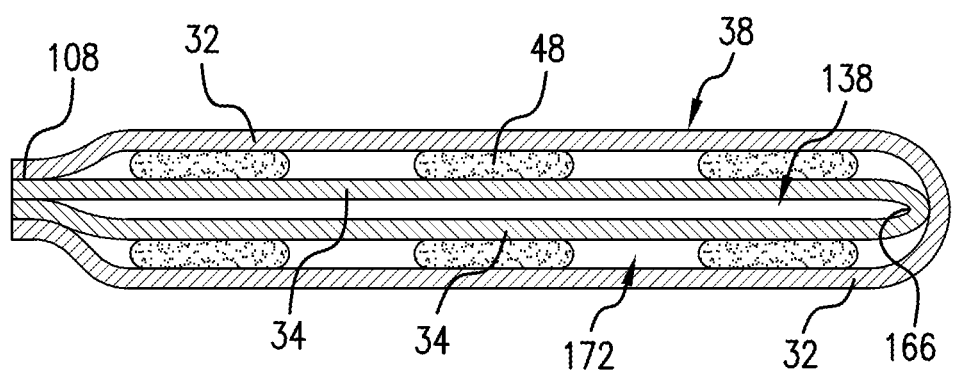
FIG. 9B is a cross-sectional longitudinal view of an expansion wall, for example the expansion wall of FIG. 9A, folded over and sealed to form a web of connected packaging containers according to an embodiment.

As shown in FIG. 9B, a cross section of a folded expansion wall 38 is illustratively depicted, in accordance with various embodiments of the present disclosure. The expansion walls 38 include spaces or wall cavities 172 between the first and second plies 32, 34, into which the expansion material 48 is housed, such that when the expansion material 48 is expanded the space between the first and second plies increases. The expansion wall 38 is folded over, at folding edge 166, forming a bag formation having an interior cavity 138. One side of the folded expansion wall 38 is folded over, while the other is sealed via a longitudinal seal 108, forming a seam. The longitudinal seals 108 includes heat activated seals (e.g., heat activated adhesive or other suitable heat-activated seals), one or more strip-seals, one or more pressure activated-seal such as, for example, pressure-activated adhesive or other suitable types of pressure-activated seals, or other suitable types of seal. The sealing material may be applied to a perimeter. In some embodiments, the sealing material has an approximately uniform width. In some embodiments, the sealing material is applied with varying widths. The expansion wall 38 can have one folding edge 166 or, alternatively, a plurality of folding edges 166.

Figure 10A:
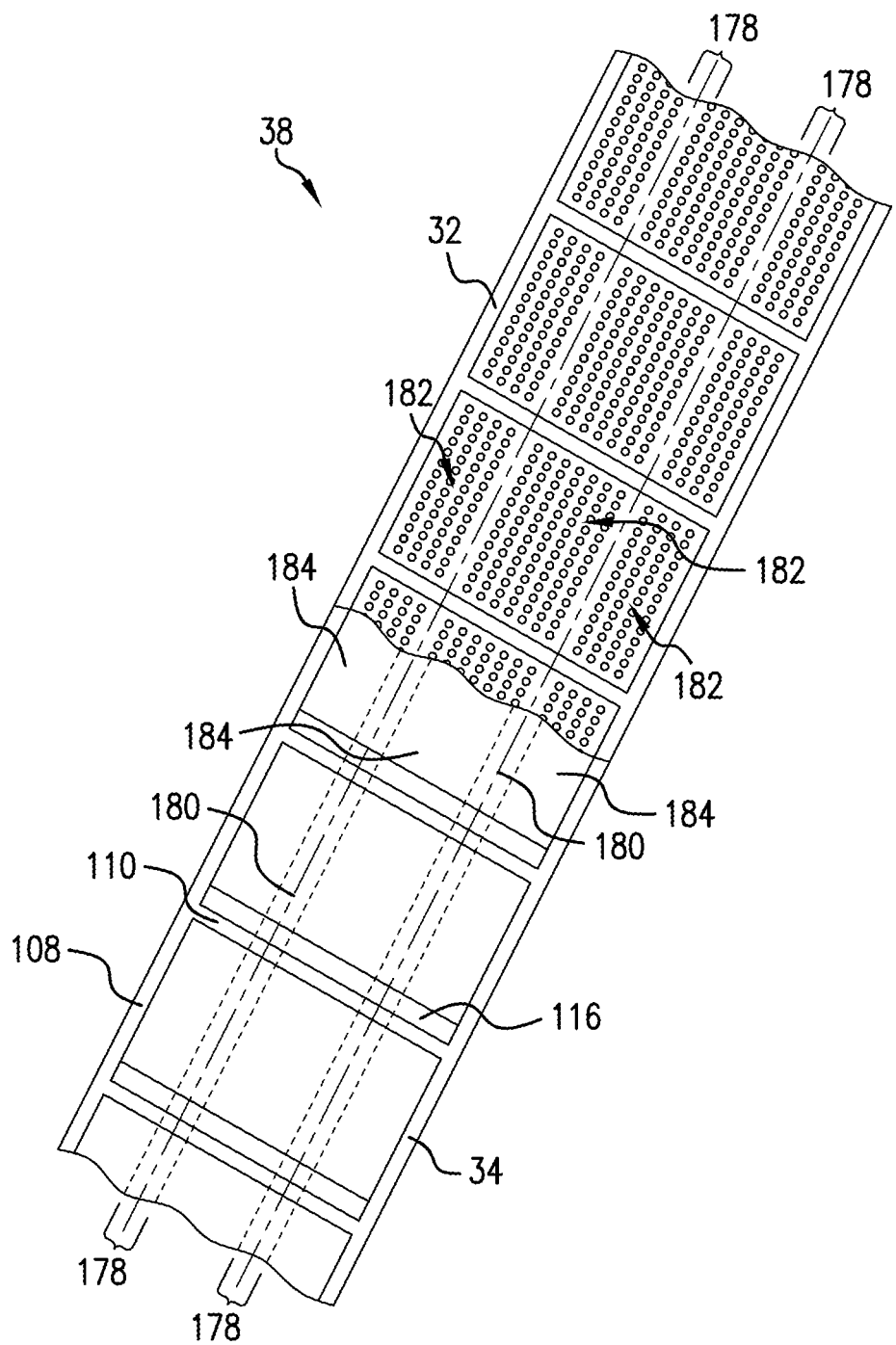
FIG. 10A is a top cutaway-view of another embodiment of an expansion wall.
Figure 10B:
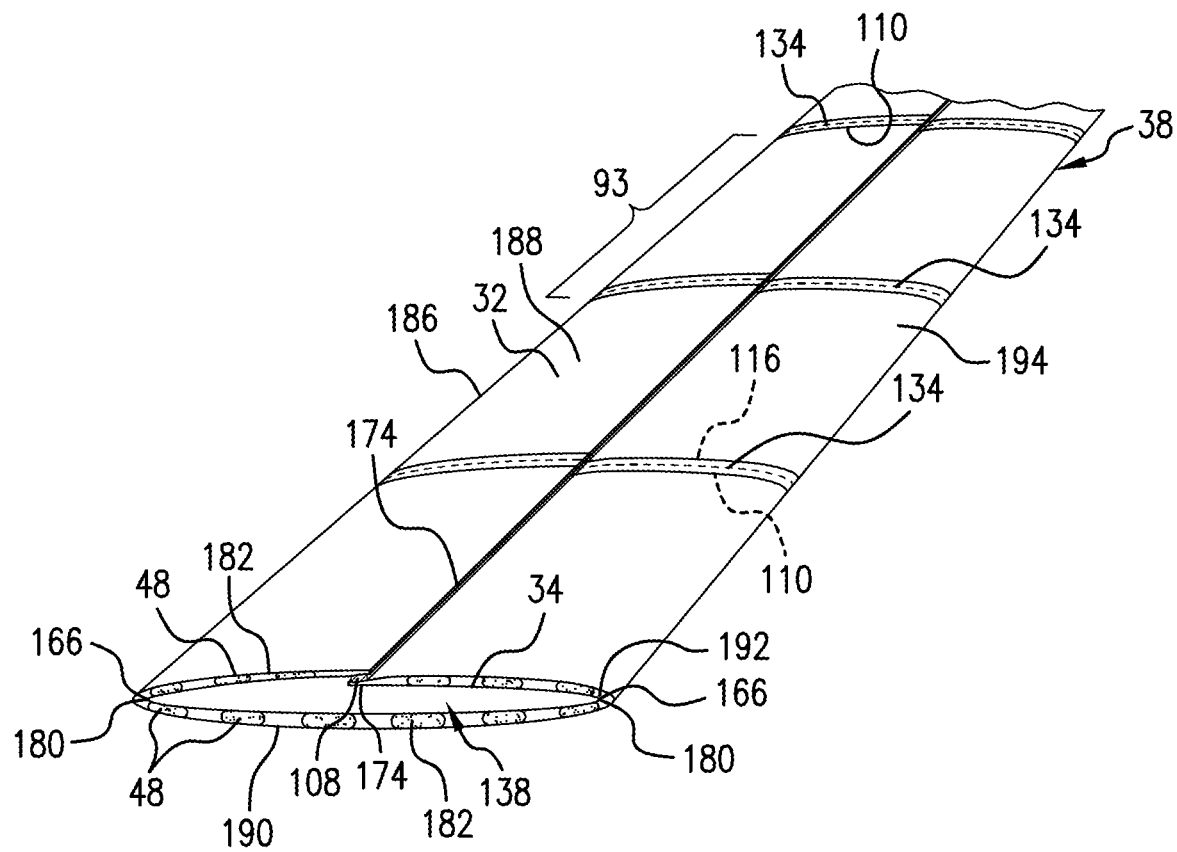
FIG. 10B is a bottom perspective view of a web of FIG. 10A, folded over and bonded to form a web of connected packaging containers.
Figure 10C:
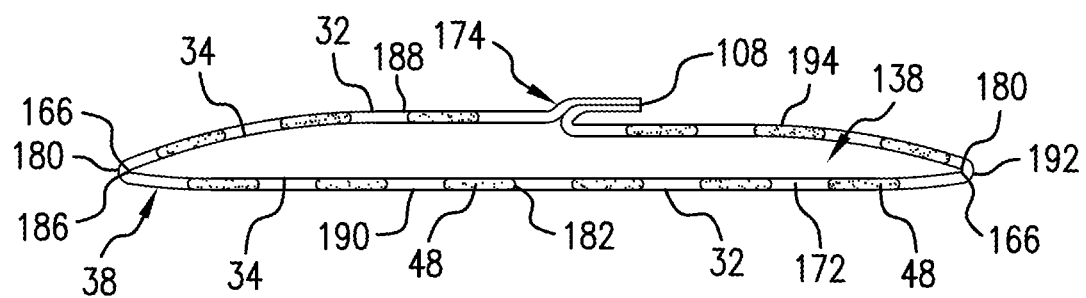
FIG. 10C is a cross-sectional longitudinal view of the web of FIG. 10B.

Once folded and flattened, the longitudinal seals 108 are aligned. In some embodiments, the seals 108 are aligned at a longitudinal edge 112 of the expansion wall 38, as shown in FIG. 9A. In other embodiments, the seals 108 are aligned at a position between a plurality of folding edges 166, forming a seam 174 at unfolded web longitudinal edge 112, as shown in FIG. 10A-10C. The expansion wall 38 includes one or more regions of weakness 134 that extend transversely (e.g., generally perpendicularly) to the longitudinal edges 112. Seam 174 includes a longitudinal edge 112 overlapping another longitudinal edge 112, wherein sealing material is applied to an upper region of one longitudinal edge and/or a lower region of the other longitudinal edge, enabling the seal 174 to be formed. In some embodiments, seal 174 can be a fin seal or other suitable seal configuration.

In this embodiment, the one or more transverse seals 110 are provided at longitudinally spaced apart locations of the expansion wall 38 and extend substantially fully transversely across the expansion wall 38 between the longitudinal edges 112 of the expansion wall 38. In other embodiments, one or more of the transverse seals 110 extend over a portion of the transverse length of the expansion wall 38.

As shown in FIG. 10A-10C, the expansion wall 38 includes first and second overlaid plies 32, 34 including a hinge area 178 disposed for folding the overlaid plies over each other at fold or hinge lines 180 that extends through the hinge area 178 to divide the overlaid plies 32, 34 into a plurality wall portions 184 on opposite sides of the hinge lines 180, such that the wall portions are folded about the hinge lines 180 to a folded configuration, defining an interior cavity 138 therebetween, the interior cavity 138 being configured to receive and house an object. The expansion material 48 is disposed between the first and second plies in a main padding area 182, wherein the hinge area between the plies has less of the expandable material than in the main padding area 182 such that, in the folded configuration, the hinge area is thinner than the main padding area. The web further includes a sealing material disposed to affix the wall portions in the folded configuration such that the first and second walls define a packaging unit. In some embodiments, the web further includes a longitudinal seal material. In some embodiments, one or both of the longitudinal edges are sealed.

In some embodiments, the hinge area 178 is substantially free of the expandable material, providing a gap between portions of the main padding area 182 on the wall portions 184. In some embodiments, the hinge area 178 includes less than 30% the amount of expandable material as the main padding area 182. In some embodiments, the hinge area 178 includes less than 25% the amount of expandable material as the main padding area 182. In some embodiments, the hinge area 178 includes less than 10% the amount of expandable material as the main padding area 182. In some embodiments, the hinge area 178 has no expansion material. In some embodiments, the hinge area 178 is a longitudinal strip having a width. However, the hinge area 178 may have one or more other suitable shapes.

In some embodiments, the first and second overlaid plies include three wall portions 184, and the hinge area 178 includes a first hinge area 186 disposed between a first 188 and second wall portion 190, and a second hinge area 192 disposed between second 190 and third wall portions 194, such that the first 188 and third 194 wall portions folded respectively about hinges 180 in the first and second hinge areas 186, 192 each overlays the second wall portion 190, such that the second wall portion 190 forms a first wall of a packaging container, and the first and third wall portions 188, 194 form a second wall of the packaging container overlaid on the first wall and defining the interior cavity 138 between the walls. The sealing material is disposed to seal the first wall to the third wall. In some embodiments, the first and third wall portions have longitudinal edges such that, in the folded configuration, the longitudinal edges are disposed above the second wall portion and are sealed together by the sealing material. In some embodiments, the second wall portion has a transverse width between the hinge lines, and the first and third wall portions cumulatively have a cumulative transverse width that is at least as wide as the transverse width of the second wall portion.

In some embodiments, the first and third wall portions 188, 194 each form one wall. In some embodiments, the first and third wall portions 188, 194 each include a longitudinal edge, and the sealing material is disposed to affix the wall portions along the longitudinal edges of the first and third wall portions.

Figure 11A:
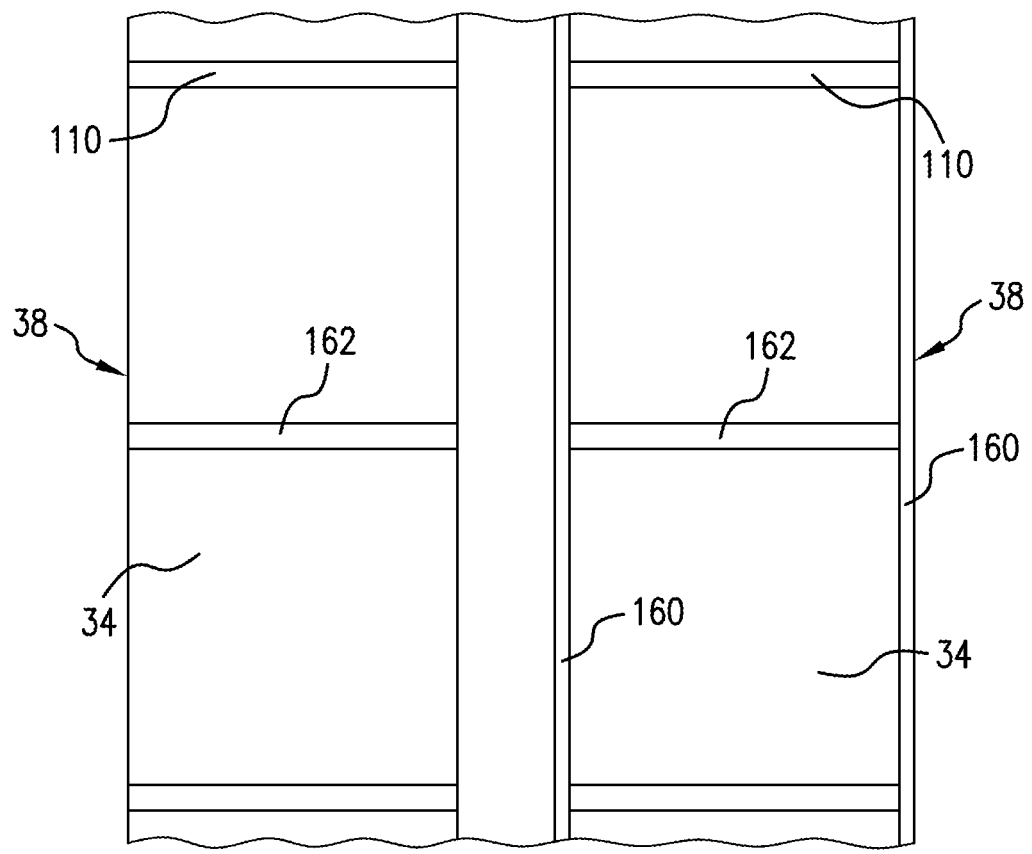
FIG. 11A is a top view of expansion walls used to form a packaging container according to an embodiment.
Figure 11B:
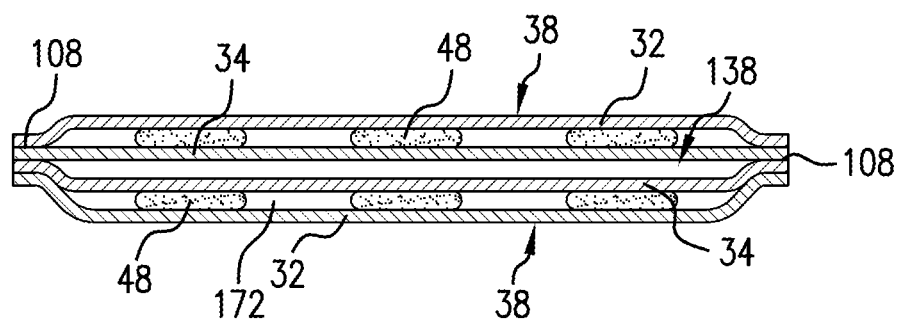
FIG. 11B is a cross-sectional longitudinal view of a packaging container formed from the expansion walls of FIG. 11A.
Figure 12:
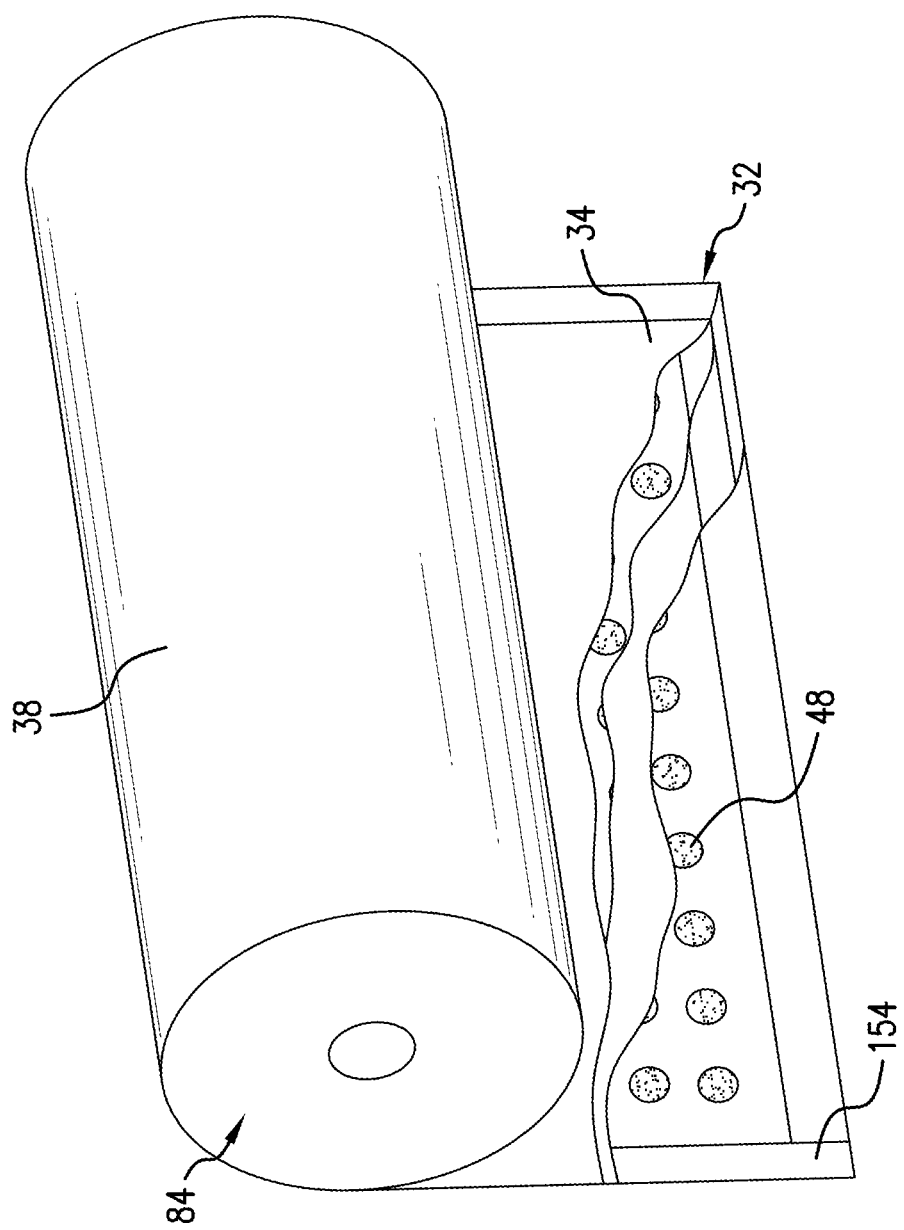
FIG. 12 is a perspective view of a completed, rolled supply web of separable packaging containers, constructed for example as shown in FIG. 11B.

As shown in FIGS. 11A and 11B, a plurality of longitudinal seals 108 are configured to seal together the plurality of expansion walls 38. According to this embodiment, the packaging containers 93 are formed by sealing together a plurality of expansion walls 38, rather than folding over a singular expansion wall 38.

Supply Configurations

Figure 13:
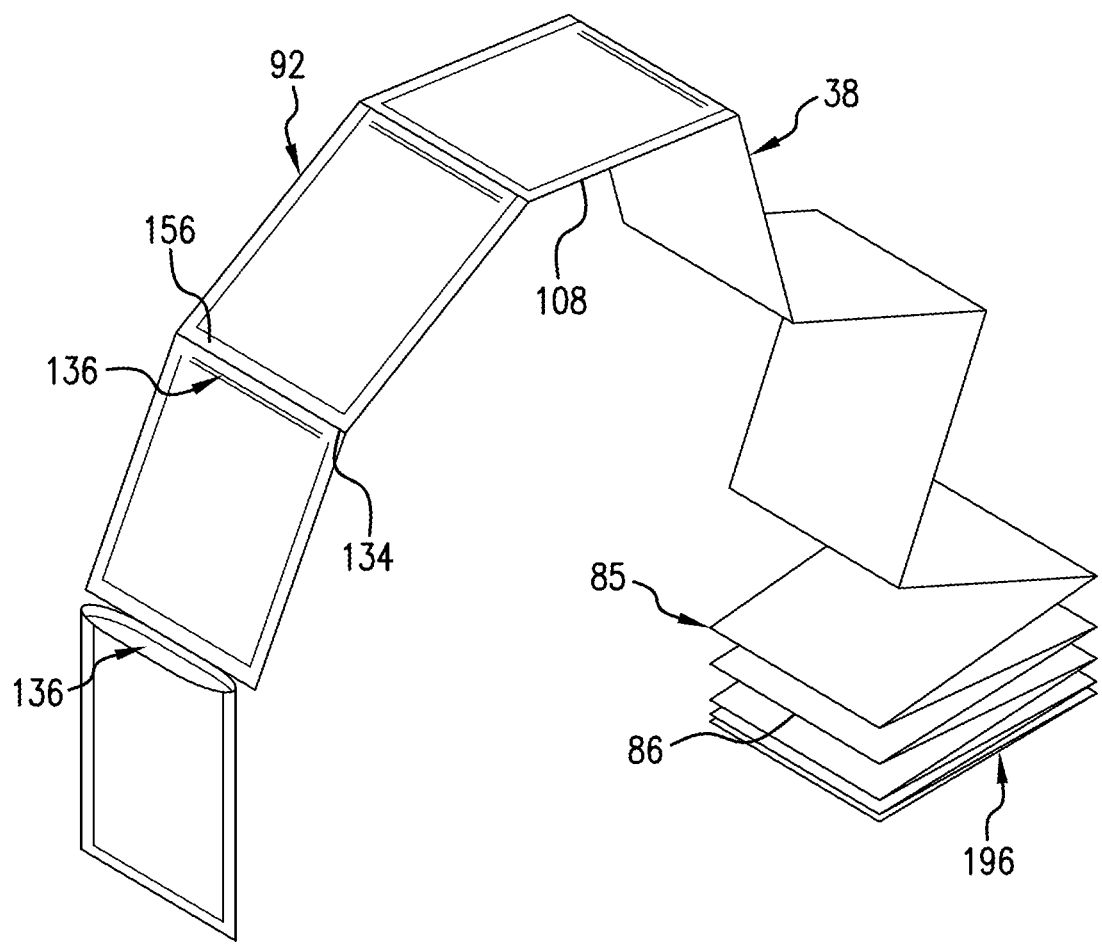
FIG. 13 is a perspective view of a completed supply web of separable packaging containers, constructed for example as shown in FIG. 11B, in a fanfold configuration.

Once the expansion wall 38 of packaging material is formed, the expansion wall 38 is consolidated into configuration, forming a web stock of packaging material. According to some embodiments, the supply configuration can be rolled into a supply roll configuration 84, such as is illustratively depicted in FIGS. 5 and 15A. The roll configuration 84 can be a cored roll configuration or coreless roll configuration. Another suitable supply configuration is obtained by folding the expansion wall 38 into a fanfold stack configuration that has opposing folds 86, such as a fanfold (e.g., accordion) configuration 85 (such as is illustratively depicted in FIG. 7A), and/or other suitable configurations. Another suitable supply configuration is a series of 2 or more stacked packaging units. As shown in FIG. 13, prior to consolidation, the expansion wall 38 is folded into a series of preformed packaging containers 93. The expansion wall 38 can be in a high-density supply configuration 84 (as shown in FIG. 5), wherein an expandable wall formed by the expansion wall 38 is compacted in an unexpanded configuration. In other embodiments, the expansion wall 38 can be in a low-density supply configuration 84 as shown in FIG. 5), wherein an expanded wall 36 formed by the expansion wall 38 is consolidated in an expanded configuration. According to other embodiments, the expansion wall 38 can be in a packaging container configuration 196 (as shown in FIG. 13), wherein one or more expansion walls 38 are configured into the series of preformed packaging containers 92 and consolidated.

Further Processing Devices

Figure 14A:
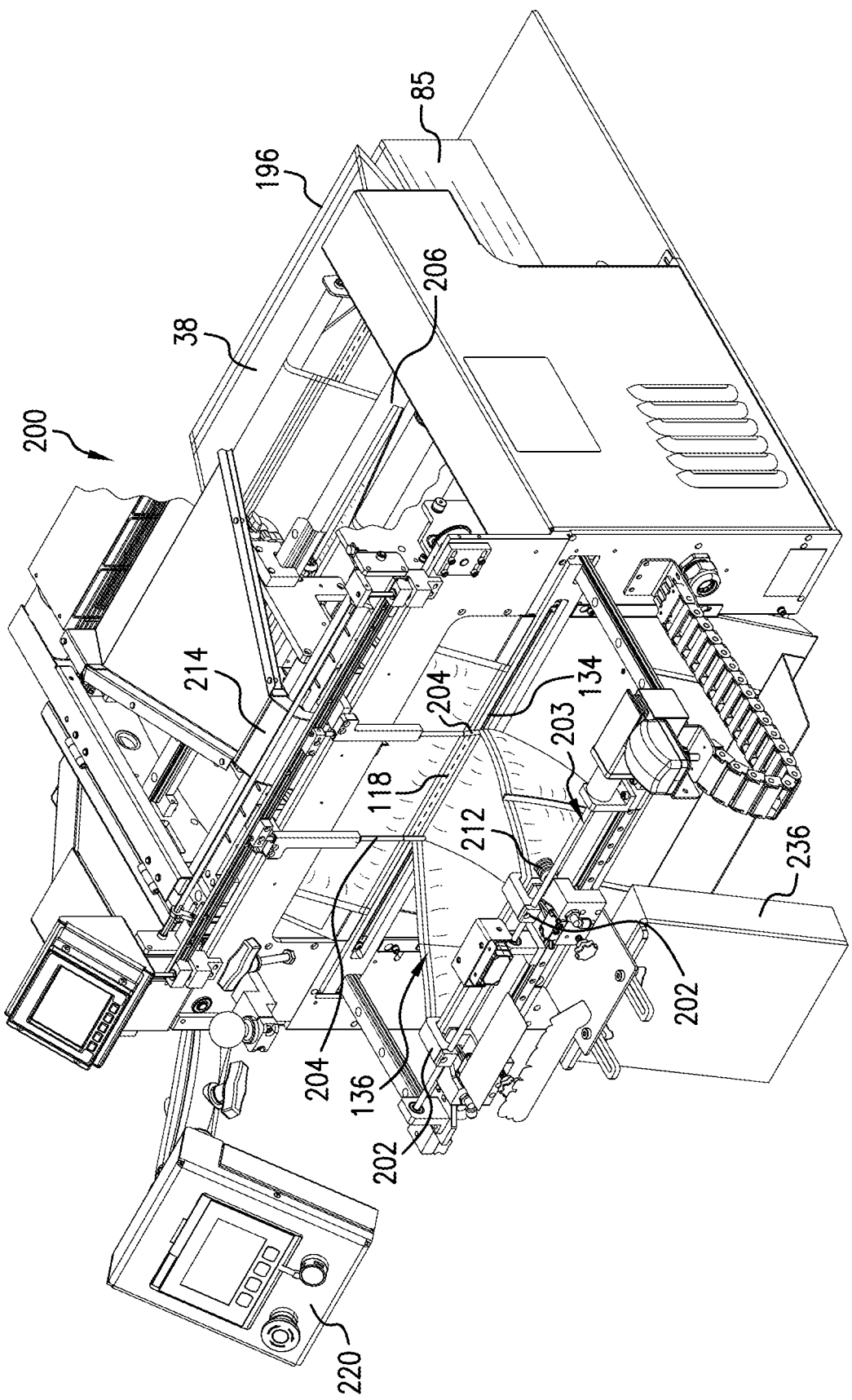
FIGS. 14A and 14B are a perspective and cross-sectional side view of an expansion and bagging device in accordance with an embodiment, for example using the supply web of FIG. 13.
Figure 14B:
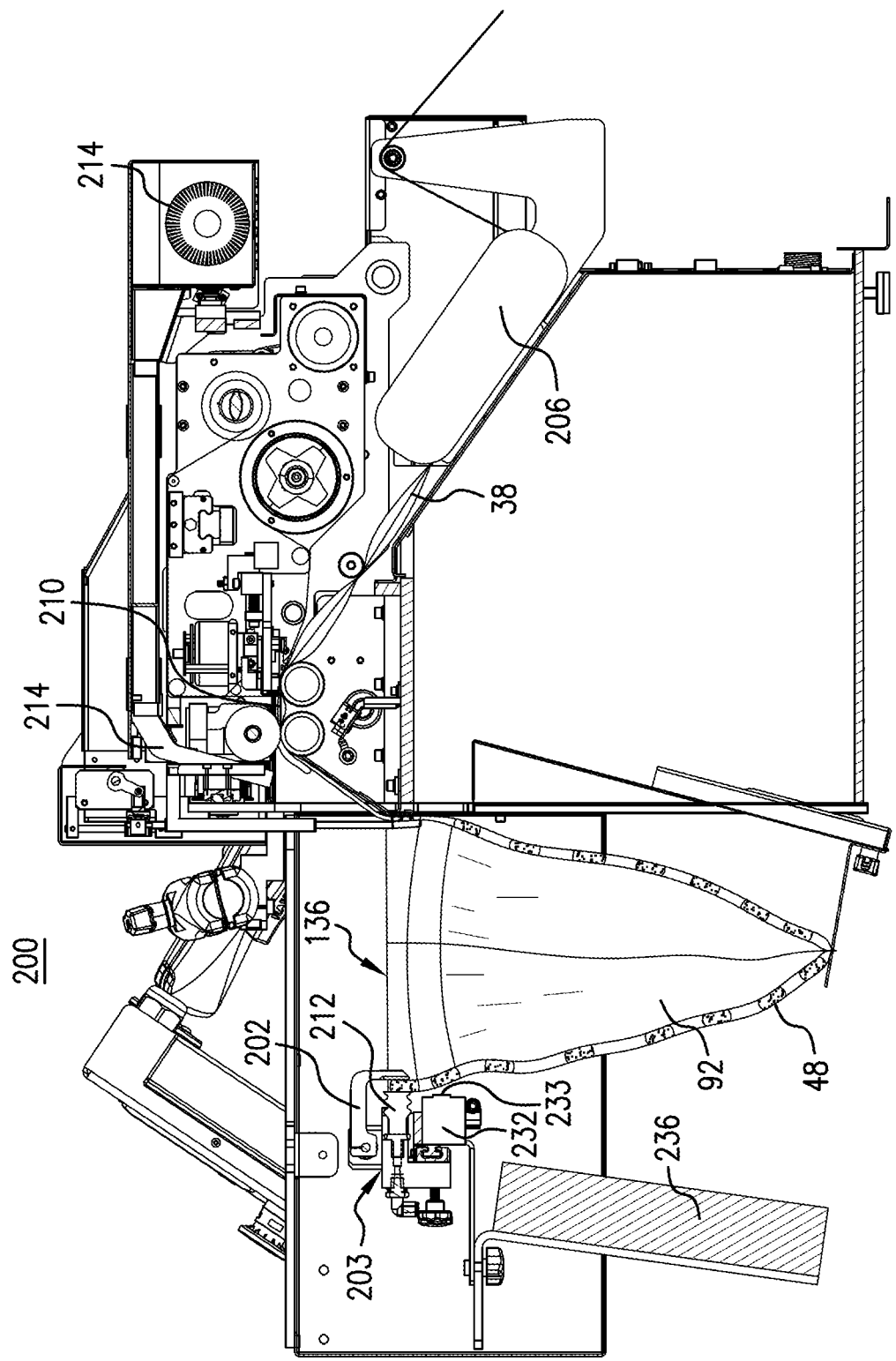

In some embodiments, once the expansion wall 38 is consolidated, it is fed through a protective packaging machine, such as that shown in FIGS. 14A and 14B.

Figure 15A:
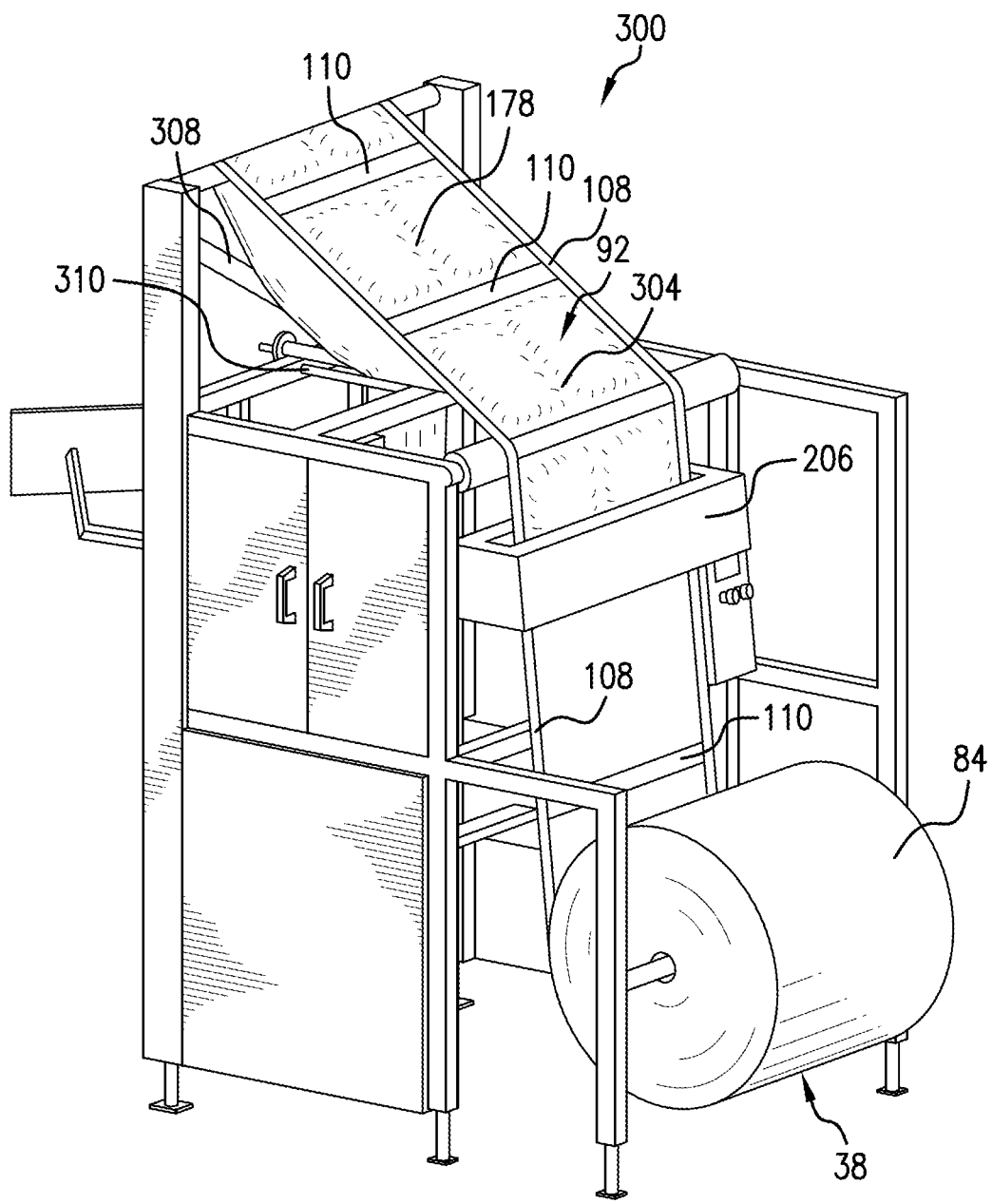
FIGS. 15A and 15B are rear and front views of an expansion and bagging device in accordance with an embodiment.
Figure 15B:
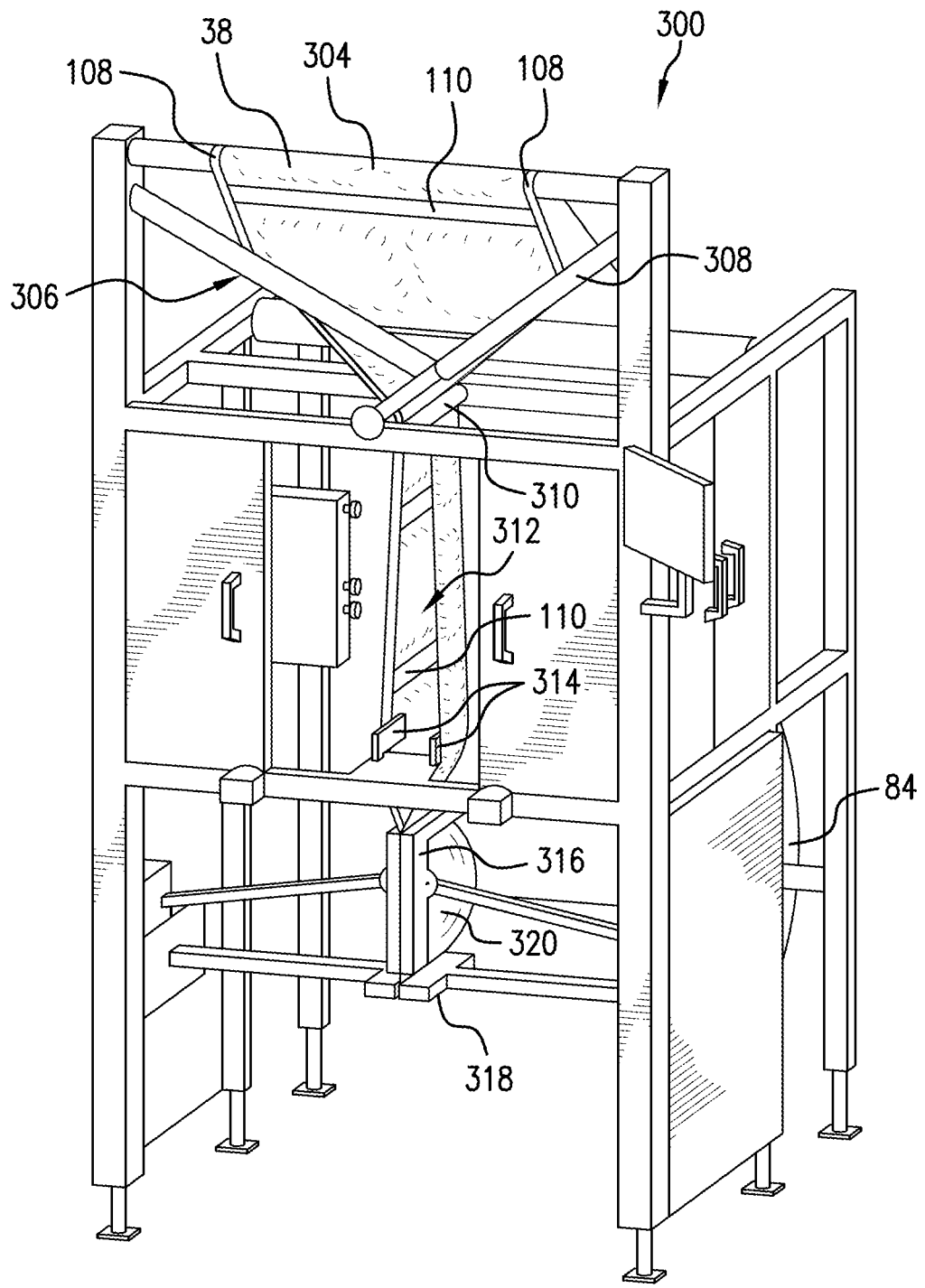

One or more steps in forming the series of bags are performed using protective packaging machines, such as the bagging machines/bagger device 200 shown in FIGS. 14A and 14B. the bagging machines/bagger devices 300 shown in FIGS. 15A-15B.

As shown in FIGS. 14A and 14B, the bagging machine 200 is fed an expansion wall 38 that has been pre-folded and/or sealed to include an expansion wall 38 of preformed bag formations. In other embodiments, such as in FIGS. 15A-15B, the bagging machine 300 is configured to receive an unfolded or unsealed expansion wall 38 and forms the expansion wall 38 into one or more packaging container formations 92.

If the expansion wall 38 includes expansion material 48, the bagging machine may, through application of heat or other suitable means, expand the expansion material prior to, during, or subsequent to setting the seals.

According to the embodiments shown in FIGS. 14A-14B, the bagging machine 200 may be configured to receive an expansion wall 38 of preformed packaging container formations 92 and be configured to open the opening 136 in each bag formation in order to access the interior cavity 138 of each bag formation 92.

In the embodiment of FIG. 14A, the bagging machine 200 includes a plurality of fingers 202 and/or telescopic projections 204 configured to pull open the bag opening 136, enabling one or more products/objects/etc. to be inserted into the interior cavity 138.

The expansion wall 38 is fed into the bagging machine 200 in an unexpanded, high-density configuration. The expansion wall 38, at the supply side of the bagging machine 200, may be in a fanfold supply configuration 85 and/or other suitable configuration such as, for example a roll configuration 84. The bagging machine 200 includes a bag handler which includes one or more mechanisms and/or devices for moving the web downstream from the supply through the bagging machine 200. The bag handler may include a bag mover configured for moving the expansion wall 38 along the bagger device 200.

The bagging machine 200 includes an expansion device 206. If the expansion wall 38 includes an expansion material 48, the expansion device 206 can include a heating element, heating coil, hot air applicator, radiofrequency radiation generator, UV light applicator, chemical reaction applicator, pressure mechanism, or other suitable device for expanding the expansion material. In some embodiments, such as that shown in FIGS. 14A and 14B, the expansion mechanism 206 is positioned and configured to expand the expandable element prior to inserting a product into the interior cavity 138. In other embodiments, the expansion mechanism 206 is positioned and configured to expand the expandable element subsequent to inserting a product into the interior cavity 138. In yet other embodiments, the expansion mechanism 206 is positioned and configured to expand the expandable element during the inserting of a product into the interior cavity 138.

As shown in FIG. 14A, the expansion device 206 is positioned upstream from a bagging mechanism 208 to deliver the expansion wall 38 to the bagging mechanism 208. The bagging mechanism 208 is configured to seal and (acting as a separator) separate bag formations from subsequent bag formations, forming individual bags.

In other embodiments, the expansion device 206 is positioned at or downstream from the bagging mechanism 208 to cause the walls of the expansion wall 38 to expand at other points during the bag-making process. In some embodiments, such as that shown in FIG. 14B, a printing assembly 210 may be used to print one or more images and/or one or more pieces of data/information onto the expansion wall 38.

As shown in FIG. 14B, the expansion mechanism 206 is configured to expand the expansion element prior to opening the bag opening 136 for insertion of one or more products. In other embodiments, the expansion mechanism 206 is configured to expand the expansion element at the same time as or after opening the bag opening 136 for insertion of one or more products.

The expansion wall 38 includes one or more regions of weakness 134 and one or more openings 136, applied prior to the sealing process. In other embodiments, the one or more regions of weakness 134 and/or one or more openings 136 are applied during or after the sealing process. The regions of weakness 134 are configured to be broken to separate one packaging container from a subsequent packaging container. The openings 136 are configured and positioned to enable access to the interior cavity 138 of a packaging container formation 92 and may be opened by the mechanical fingers 202 and/or suction cups 212. Pressurized air can be used to aid in opening the opening 136 in the packaging container formations 92.

The fingers 202 are configured to pinch a portion of the packaging container opening 136, providing further securing means of opening up the packaging container at the opening 136 and holding the packaging container in place. The bagging machine 200 can include an air blower 214 configured to apply air pressure to the opening 136 to aid in opening the packaging container. The opening 136 can include a pouch seal. The pouch seal can include an adhesive for sealing closed the opening 136 once product is inserted. Other forms of sealing the opening 136, such as heat sealing, can, additionally or alternatively, be implemented. Once the opening 136 is closed and sealed, the regions of weakness 134 can be broken by suitable means such as, for example, reversing the next packaging container, cutting, melting, or other suitable means.

Each packaging container 92 in the expansion wall 38 can be separated using a pulling force applied to each packaging container 92, tearing the region of weakness 134 located between each packaging container 92 in a series of packaging containers 92, or using one or more cutting edges configured to form a laceration along the seam connecting two packaging containers 92 in the series of packaging containers 92. In some embodiments, each packaging container 92 in the series of packaging container 92 is separated using focused heat configured to melt a portion of the seam connecting two packaging containers 92 in the series of packaging containers 92.

Now referring to FIGS. 15A and 15B, a bagging machine 300 is configured to both convert and seal the expansion wall 38 into one or more completed packaging containers. The expansion wall 38 is fed, via a bag handler, into the bagging machine 300 in an unexpanded, high-density configuration. The expansion wall 38 can be in a roll configuration 84. The bag handler may include a bag mover configured for moving the expansion wall 38 along the bagger device 300. In other embodiments, the expansion wall 38 may be in one or more other unexpanded, high-density configurations such as, for example, a fanfold configuration 85.

Once fed into the bagging machine 300, the expansion wall 38 passes through an expansion device 206 configured to expand the expandable element of the expansion wall 38. According to some embodiments, the expansion wall 38 includes one or more hinge lines 166, 178 which include a section 304 of the expansion wall 38 that is unexpanded, or includes less of, or is absent, an expansion material, forming a natural hinge to facilitate folding of the expansion wall 38. In some embodiments, lines of the expansion wall 38 can be left free of expansion material 48 to form natural hinge lines or regions that are more easily bent than other regions in which the expansion material 48 is expanded. In some embodiments, pressure is applied to the expansion material 48 during or subsequent to expansion, forming hinge lines or regions 55 at section 304 that are more easily bent than other regions.

The expanded expansion wall 38 proceeds to be fed through a folding apparatus/bag folder 306 configured to fold the expansion wall 38 such that the longitudinal edges of the expansion wall 38 come into contact with each other. The folding apparatus 306 may include one or more folding bars 308 configured to fold the expansion wall 38 into a C-fold formation. The folding apparatus 306 can fold the expansion wall 38 along hinge area 178, or at one or more other sections. The folding apparatus 306 may further include a cross-bar 310 configured to align the expansion wall 38 such that the folded expansion wall 38 forms an interior cavity 312. Once folded, a series of retaining mechanisms (e.g., fingers 314) hold open the expansion wall 38, enabling one or more products to be placed into the interior cavity 312. In FIG. 15B, the web is positioned vertically while the product is placed into the interior cavity 312 horizontally, while the opening is transverse to a longitudinal direction of the expansion wall. In other embodiments, the expansion wall can be positioned horizontally or at another suitable angle (e.g., with the opening to the interior cavity 312 facing upwards).

Once the product is placed into the interior cavity 312, the expansion wall 38 is fed to a sealing mechanism 316 configured to seal the longitudinal seal and transverse seals of the expansion wall 38. The sealing mechanism 316 can be configured to apply heat, pressure, and/or other suitable means of setting the seals. In some embodiments, the sealing mechanism 316 is configured to pull the web through the bagging machine 300 for sealing. Once sealed, the expansion wall 38 is converted into a formed and sealed bag 302. According to some embodiments, the bagging machine 300 includes a separating mechanism 318 configured to separate a packaging container 92 from the expansion wall 38. In some embodiments, the separating mechanism 318 is configured to pull on the completed bag 320, tearing the completed bag 320 from a subsequent bag along a region of weakness 134. In some embodiments, the separating mechanism 318 is configured to separate the bag 320 via cutting via a blade or heat. In some embodiments, the separating mechanism 318 may incorporate other suitable means of separation. According to some embodiments, the separating mechanism 318 is configured to hold the bag 302 in place to enable the sealing mechanism 316 to seal a subsequent bag.

In some embodiments, the bagging machine may processed already expanded expansion wall 38 supply material, or it may comprise an expansion device to expand the material pre-, during-, or post-production of the packaging product. In some embodiments, the bagging machine may be configured to handle individual mailers or bags, rather than stock expansion wall 38 supply material.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is also to be understood that the terminology used herein is for describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

What is claimed is:

1. A method for making an expansion wall, comprising:
applying a matrix to a first ply;
applying an expansion element to a surface of the matrix;
applying a second ply over the first ply to trap the matrix and expansion element therebetween; and
inserting the applied expansion element into the applied matrix to provide an expansion material that is configured to expand to, and solidify in, an expanded condition upon activation.

2. The method of claim 1, wherein the expansion element is selected to cause the matrix to expand upon the activation to provide the expansion of the expansion material, and the matrix is selected to solidify upon the activation to provide the solidification of the expansion material to provide padding between the first and second plies.

3. The method of claim 1, wherein inserting the expansion element into the matrix includes squeezing the first and second plies together to force the expansion element into the matrix, such that when activated, the expansion element causes the matrix to expand, thereby increasing a spacing between the first and second plies.

4. The method of claim 1, wherein the expansion element comprises particulates that stick to the surface of the matrix upon application to the surface of the matrix.

5. The method of claim 4, further comprising:
collecting the particulates that did not stick to the matrix during the application of the particulates to the surface of the matrix;
reapplying the collected particulates to the surface of additional matrix to provide the additional matrix on the first ply with the collected particulates on its surface; and
wherein the plies are squeezed about the additional matrix and reapplied particulates.

6. The method of claim 1, wherein application of the expansion element includes an applicator device that blows the expansion element towards the first ply and the matrix for randomized distribution of the expansion element.

7. The method of claim 1, wherein the expansion element is applied to the matrix before the matrix applied to the first ply.

8. The method of claim 1, wherein the expansion element comprises a plurality of microspheres containing a material that when activated exits the microspheres as a gas.

9. The method of claim 1, wherein the matrix is a fluid.

10. The method of claim 1, further comprising activation of the expansion element to form an expanded wall.

11. The method of claim 1, wherein the first and second plies comprise paper.

12. The method of claim 1, wherein the matrix is a starch-based adhesive.

13. The method of claim 1, wherein the second ply is applied to form expansion wall, such that the forming of the expansion wall includes rolling or fanfolding the expansion wall, to provide a supply of the expansion wall.

14. The method of claim 1, further comprising forming regions of weakness extending transversely across one or both of the first and second plies and configured for facilitating separation of parts of the plies from each other.

15. The method of claim 1, wherein the second ply is applied to form the expansion wall, the method further comprising:
    folding the expansion wall along a fold line to place a first side of the expansion wall against a second side of the expansion wall; and
    sealing the first side of the expansion wall to the second side of the expansion wall to define an interior cavity therebetween configured to receive an object to be packaged.

16. The method of claim 15, further comprising activating the expansion element to form a padded container comprising the interior cavity.

17. The method of claim 1, wherein the expansion element is applied to the surface of applied matrix.

18. The method of claim 1, wherein:
    the applying of the matrix comprises dispensing the matrix; and
    the applying of the expansion element comprises dispensing the expansion element to apply the expansion element to the surface of the dispensed matrix as the dispensed matrix is travelling towards the first ply, such that the matrix is applied to the first ply with the expansion element on the surface thereof.

19. The method of claim 18, wherein:
    the matrix is dispensed by ejecting the matrix in a trajectory towards the first ply; and
    the expansion element is applied to the ejected matrix as the matrix is travelling along the trajectory.

20. A method for making an expansion-wall web, comprising:
    applying, by depositing with a matrix applicator, a matrix to a first ply;
    applying an expansion element to a surface of the matrix after the matrix is dispensed from the matrix applicator and before the matrix is deposited on the first ply to provide an expansion material; and
    applying a second ply over the first ply to trap the matrix and expansion element therebetween,
    wherein the matrix is selected such that, after activation of the expansion material, the matrix expands and the expanded matrix solidifies to provide padding between the first and second plies.

21. The method of claim 20, further comprising moving the first ply with the applied matrix using a device, such that the expansion element is applied to the applied matrix on the moving ply.

22. The method of claim 21, further comprising inserting the applied expansion element into the applied matrix.

23. The method of claim 21, further comprising activating the expansion element to form an expanded-wall web.

24. A device for producing an expansion-wall web, the device comprising:
    a matrix applicator for applying a matrix to a first ply;
    an expansion element applicator to apply an expansion element onto the surface of the matrix; and
    an entrainment device for inserting the applied expansion element into the matrix, such that activation of the expansion element will cause the matrix to expand to and solidify in, an expanded condition.

25. The device of claim 24, further comprising an expansion activator that activates the expansion element and causes expansion of the expansion material.

26. The method of claim 1, wherein the expansion element is applied to the matrix after the matrix is applied to the first ply.

* * * * *